United States Patent
Gonen et al.

(10) Patent No.: US 7,991,394 B2
(45) Date of Patent: Aug. 2, 2011

(54) LOCAL NUMBER SOLUTION FOR ROAMING MOBILE TELEPHONY USERS

(75) Inventors: Shmuel Gonen, Shoham (IL); Guy Weintraub, Ramat-Gan (IL)

(73) Assignee: StarHome GmbH, Zurich (CH)

( * ) Notice: Subject to any disclaimer, the term of this patent is extended or adjusted under 35 U.S.C. 154(b) by 540 days.

(21) Appl. No.: 11/354,931

(22) Filed: Feb. 16, 2006

(65) Prior Publication Data

US 2006/0205404 A1 Sep. 14, 2006

Related U.S. Application Data

(60) Provisional application No. 60/653,132, filed on Feb. 16, 2005, provisional application No. 60/682,378, filed on May 19, 2005, provisional application No. 60/720,033, filed on Sep. 26, 2005.

(51) Int. Cl.
*H04W 4/00* (2009.01)
(52) U.S. Cl. .............. 455/432.1; 455/432.2; 455/432.3; 455/433; 455/435.1; 455/445; 455/551
(58) Field of Classification Search .............. 455/432.1, 455/432.2, 432.3, 433, 551, 466, 445, 461, 455/552.1, 435.1, 435.2, 424, 463, 550.1
See application file for complete search history.

(56) References Cited

U.S. PATENT DOCUMENTS

| | | | | |
|---|---|---|---|---|
| 5,353,340 A | * | 10/1994 | Kunz | 455/432.1 |
| 5,878,348 A | * | 3/1999 | Foti | 455/434 |
| 5,884,169 A | * | 3/1999 | Uchiyama et al. | 455/433 |
| 5,933,785 A | * | 8/1999 | Tayloe | 455/558 |
| 5,978,678 A | * | 11/1999 | Houde et al. | 455/433 |
| 6,035,198 A | * | 3/2000 | Wiehe | 455/445 |
| 6,081,705 A | * | 6/2000 | Houde et al. | 455/411 |
| 6,161,017 A | * | 12/2000 | Britt et al. | 455/445 |
| 6,226,517 B1 | * | 5/2001 | Britt et al. | 455/445 |
| 6,381,470 B1 | * | 4/2002 | Griffith et al. | 455/551 |
| 6,408,181 B1 | * | 6/2002 | Ho et al. | 455/432.1 |
| 6,424,832 B1 | * | 7/2002 | Britt et al. | 455/432.1 |
| 6,603,968 B2 | * | 8/2003 | Anvekar et al. | 455/433 |
| 6,671,523 B1 | * | 12/2003 | Niepel et al. | 455/558 |
| 6,684,073 B1 | * | 1/2004 | Joss et al. | 455/433 |
| 6,738,622 B1 | | 5/2004 | Stadelmann et al. | |
| 7,505,769 B2 | * | 3/2009 | Jiang | 455/432.3 |
| 7,613,454 B2 | * | 11/2009 | Zhang | 455/432.1 |
| 2002/0004394 A1 | * | 1/2002 | Tsai et al. | 455/432 |
| 2002/0052212 A1 | * | 5/2002 | Aschir | 455/466 |
| 2004/0087307 A1 | * | 5/2004 | Ibe et al. | 455/436 |
| 2004/0176092 A1 | | 9/2004 | Heutschi | |
| 2004/0192294 A1 | * | 9/2004 | Pan et al. | 455/432.1 |
| 2008/0188218 A1 | * | 8/2008 | Sherman et al. | 455/432.1 |

OTHER PUBLICATIONS

IPRP CH I dd Aug. 30, 2007.

* cited by examiner

*Primary Examiner* — Olumide T Ajibade Akonai

(57) ABSTRACT

A system for managing of mobile phones at a roaming network, each mobile handset having a first handset number from its home network. The roaming network assigns a second number to a detected roamer, which number is local to the roaming network. The second number is not known directly to the handset, which continues to identify itself using the first number. The handling unit acts as a local home location register for handling local management of the roaming handset using both the second number and the first number, thus allowing the handset to identify itself using the first number but be called using the second number at local call rates.

21 Claims, 14 Drawing Sheets

LOCAL NUMBER SOLUTION FOR ROAMING MOBILE TELEPHONY USERS

RELATED APPLICATIONS

The present application claims priority from U.S. Provisional Patent Application No. 60/653,132, filed on Feb. 16, 2005, U.S. Provisional Patent Application No. 60/682,378, filed on May 19, 2005, and U.S. Provisional Patent Application No. 60/720,033, filed on Sep. 26, 2005, the contents of which are hereby incorporated by reference.

FIELD AND BACKGROUND OF THE INVENTION

The present invention relates to a local number solution for roaming mobile telephony users.

Along with everyone else, frequent travelers pay premium rates for using their mobile phones while roaming. For frequent travelers, however, the costs mount up rather more quickly than for everyone else. To reduce their costs, frequent travelers therefore often purchase local prepaid SIM cards and in this way they can be reached, at least by their local contacts, using local call costs. This reduces mobile terminated (MT) costs and removes the burden of international call expenses from local contacts. Such a solution is advantageous for the business traveler who has locally based business contacts.

This situation however causes travelers some inconvenience if they want to receive International and local calls at the same time. Either they must carry two SIM cards, one for local and one for international use. Alternatively the traveler must keep two mobile handsets, one for local and one for International use. If the traveler uses just one SIM card then she must replace the SIM in her mobile handset (if not SIM locked)—thus missing incoming calls on the inactive SIM.

Mobile phone users expect their roaming experience to match their mobile lifestyles, with easy access to both services and people anywhere, anytime. Yet, dialing and receiving calls in visited networks is usually carried out at premium rates.

The result is that roamers look for cheaper methods of using their handsets. Turning OFF the handset is one sure way to lower roaming expenses and rejecting incoming calls is another. Many roamers, traveling frequently to specific destinations, buy local prepaid cards for roaming in the visited country. However, when they replace the SIM in their handsets, they become unavailable on their home network MSISDN, These roamers tend to use two handsets, in order to enable both numbers concurrently.

It is further noted that roaming users are regarded as very valuable customers by cellular handset companies, frequent roamers all the more so, and the more it is possible to attract and retain roamers at any given network the better.

It is also noted that the tendency of a roamer to have a second, local number via a replacement SIM card represents loss of revenue to the originating network of the roamer, whose services are not being utilized as long as its own SIM card is removed.

There is thus a widely recognized need for, and it would be highly advantageous to have, a system for roaming users which is devoid of the above limitations.

SUMMARY OF THE INVENTION

According to one aspect of the present invention there is provided a system for managing of mobile phones at a roaming network, each mobile handset having a home network and a first number associated with said home network, and being currently located at said roaming network, the system comprising:

an assignment unit for assigning a second number to a respective roaming handset, said second number being associated with said roaming network, and a handling unit for handling management of said respective roaming handset using said second number.

According to a second aspect of the present invention there is provided a method of operating mobile handsets at a roaming network, said roaming network being a network other than a respective home network, respective mobile handsets having a first number associated with the home network, the method comprising:

assigning to a respective mobile handset a second, handset number associated with said roaming network, assigning a substitute home location register at said roaming network adapted to receive location queries based on said second number for routing corresponding calls to said respective handset, and querying a visited location register at said roaming network for routing of said calls using said first number.

According to a third aspect of the present invention there is provided a method of operating a roaming mobile handset having a first number associated with a home number, and a second number associated with said roaming network being usable at said roaming network for contacting said roaming mobile handset, the method comprising:

at said roaming network detecting an outgoing call being made at said roaming mobile handset, and selecting between said first handset number and said second handset number to be sent as an identifier with said call.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary In the drawings:

FIG. 7 illustrates mobile terminated (MT) call flow, FIG. 8 illustrates mobile terminated SMS flow, FIG. 9 illustrates mobile originated call flow, FIG. 10 illustrates mobile originated SMS flow with a relay, and FIG. 11 is mobile originated SMS using an Intelligent network (IN);

DESCRIPTION OF THE PREFERRED EMBODIMENTS

Figure 1:
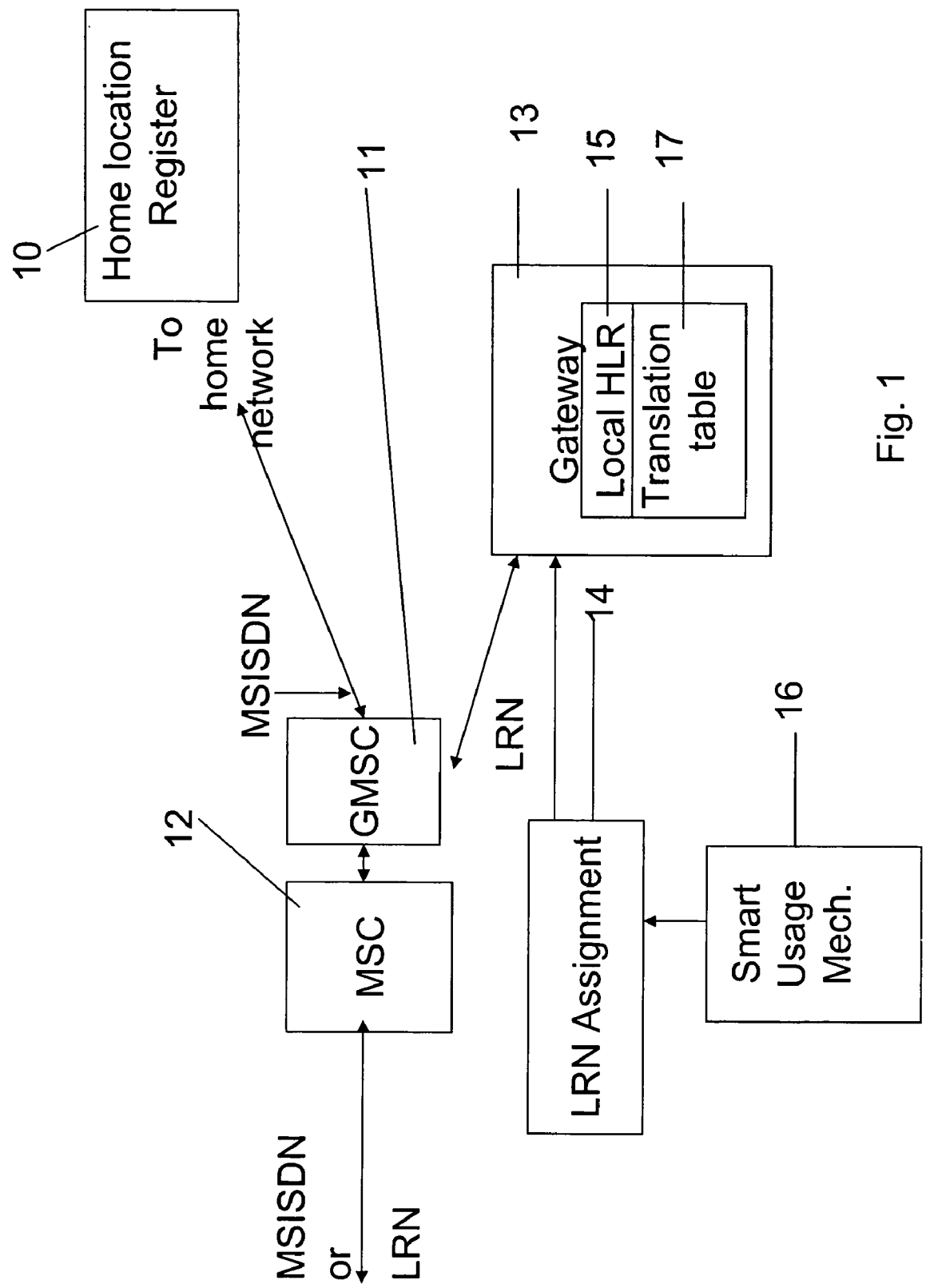
FIG. 1 is a simplified block diagram illustrating a system for managing roaming handsets on a network using local numbers, at a visited network, according to a first preferred embodiment of the present invention.

The present embodiments comprise an apparatus and a method for providing individual roaming cellular handsets with two handset numbers that can be used simultaneously. The first number is the original number of the cellular handset based on its home network, and allows International calls on the terms and conditions provided to an International Roamer. The second number is based on the local network, and permits calls as if the handset is a local handset. That is to say the local number associates the roaming mobile handset with the visited network.

The roaming network assigns the second, or local, number to a detected roamer. The second number is not known directly to the handset, which continues to identify itself using the first number. A handling unit, at the roaming network, acts as a local home location register for handling local management of the roaming handset using both the second number and the first number. The handset identifies itself using the first number but can be called using the second number at local call rates, if and when the caller is in the local network too of course, and the handling unit matches between the two numbers.

The handling unit is typically part of an intelligent gateway, a feature provided on cellular networks to manage roaming traffic.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which illustrates a system for managing of mobile handsets during roaming. Each mobile handset has a home network and is located at another network where it is roaming.

The current location of any handset, in terms of which VLR (Visitor Location Registry) serves the mobile handset, is provided to and stored at all times in a unit known as the home location register or HLR. Updating the HLR is carried out using a procedure known as location update. When a call is made to a given mobile handset, the number or MSISDN is referred to the HLR, which checks the current location of the handset and then refers the call to the appropriate VLR. The procedure is the same irrespective of whether the VLR pointed to is on the local network or on a roaming network.

In accordance with the present embodiments, as a mobile handset arrives at a roaming network, it is offered a new handset number which is a local number to that network, hereinafter a local roaming number or LRN. The number is provided to the handset by the local network without reference to the home network and allows the user to receive local calls at the roaming network without having to pay International rates. It will be noted that the handset still has to be traced using the location registers, and the HLR of the handset only knows the handset's home number or MSISDN. The local roaming number LRN is not recognized at the home location register HLR. handset Calls that are made to the first number, that is to the original MSISDN are forwarded to the GMSC (Gateway MSC), at the home network (not shown), because the MSISDN maps to the home network. The GMSC queries the HLR in order to obtain the MSRN, the Mobile Subscriber Roaming Number. The HLR knows where the subscriber is located to obtain the serving VLR, namely the VLR at which the roaming handset is currently located. The HLR queries the serving VLR for the MSRN, by using a PRN MAP message (Provide Roaming Number). It then receives the MSRN, and provides it back to the GMSC. The GMSC then forwards the call to the roaming MSC 12 as shown in FIG. 1. However if a call is made using the second number, the LRN, then the LRN is received at the GMSC 11 of the visited network, because the LRN is an MSISDN belonging to the visited network, and it does not map to the HLR. Rather the LRN maps to a substitute HLR, located at gateway 13. The GMSC 11 of the visited network is configured to forward any of a range of numbers set aside for LRN use to the substitute HLR, and thus any numbers in the specific range are automatically mapped to the substitute HLR. Gateway 13 is an intelligent gateway, provided to manage roaming calls on the network, and includes for this purpose a substitute HLR 15. The substitute HLR keeps location information for the roaming handset corresponding to the LRN and allows the handset corresponding to the LRN to be traced. The LRN number is thus referred directly to the gateway 13 in order to trace the handset and forward the call. As will be explained below, one of the ways in which the substitute HLR maintains the location of the handset is that it monitors the International connections for location update messages using the corresponding MSISDN.

In the preferred embodiments the actual roaming handset does not know about its local roaming number, so that any attempt to query the location of the handset by the substitute HLR 15 uses the MSISDN. More specifically, the substitute HLR queries the serving MSC for the MSRN, receives the MSRN, and sends the MSRN back to the GMSC of the visited network, which in turn forwards the call directly to the MSRN, and thus to the roaming handset. Thus the substitute home location register also has to translate the LRN into the MSISDN for the query that is made to the serving MSC. Hence the gateway provides a unit 17 hereinafter the translation register, that works with the substitute home location register, and substitutes the local roaming number for the home number, LRN→MSISDN for inbound queries, and does the reverse for location update messages picked up by monitoring.

The local HLR and translation table are typically, but not essentially, provided as part of intelligent gateway 13, as explained above. The intelligent gateway is a feature often provided at a network to manage roaming calls, as will be explained in greater detail below.

As a result, the roaming handset is accessible via both the local roaming number LRN and the MSISDN or home number simultaneously.

Figure 2:
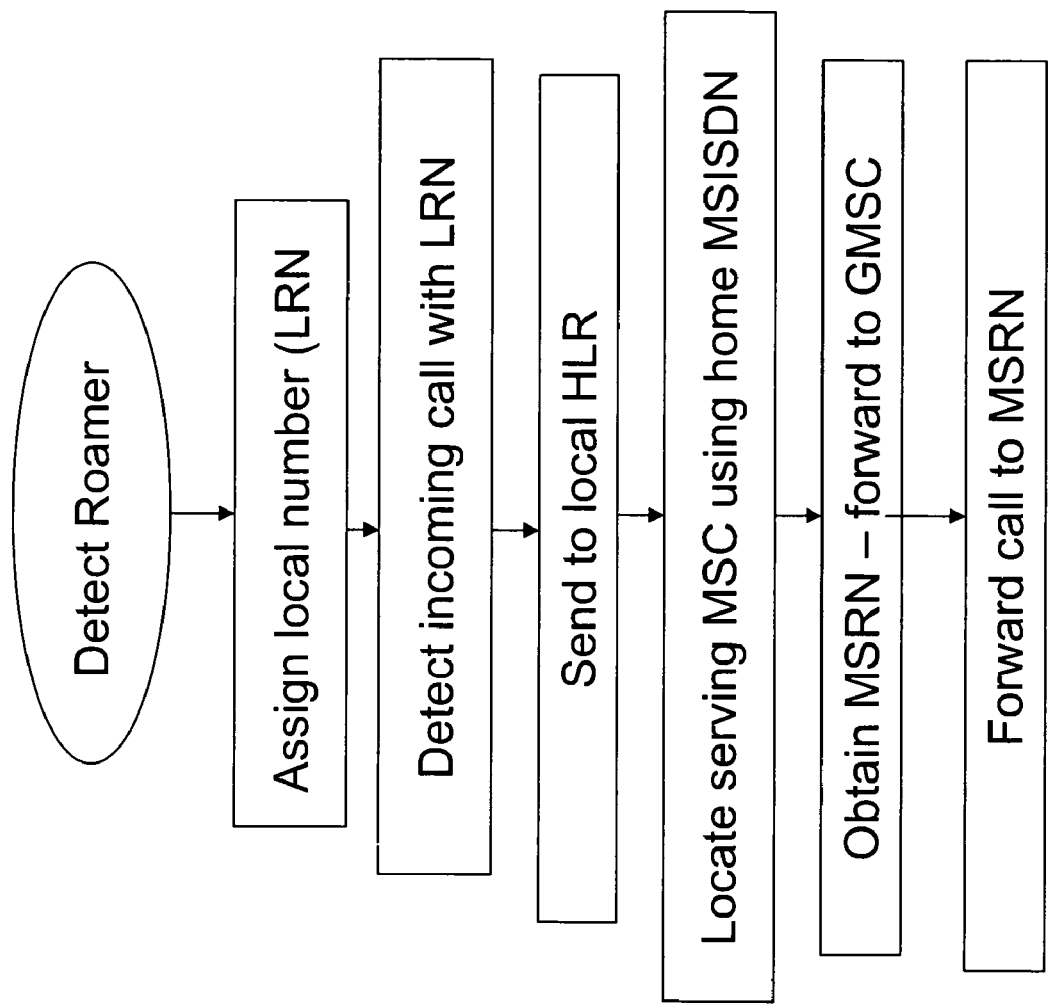
FIG. 2 is a simplified flow chart illustrating system flow for managing roaming handsets on a network using local numbers according to the embodiment of FIG. 1.

Reference is now made to FIG. 2, which is a simplified flow chart illustrating a method of accessing mobile handsets when outside their home network. The method comprises an initial stage of assigning a local handset number or local roaming number LRN to a roaming handset that arrives at the network. The number is a local number, that is to say a handset number that is assigned by the network and has the leading digits for country and network that identify that network. The number is set up on the network as a substitute for the home number of the roaming mobile unit.

Upon receipt of an incoming call which is addressed to the roaming handset using the LRN, the number received by the GMSC of the visited network as an LRN and is sent to the local HLR. At the local HLR the LRN is translated into the home number (MSISDN) of the handset so that the intended handset can be reached in the normal way as explained above.

Figure 3:
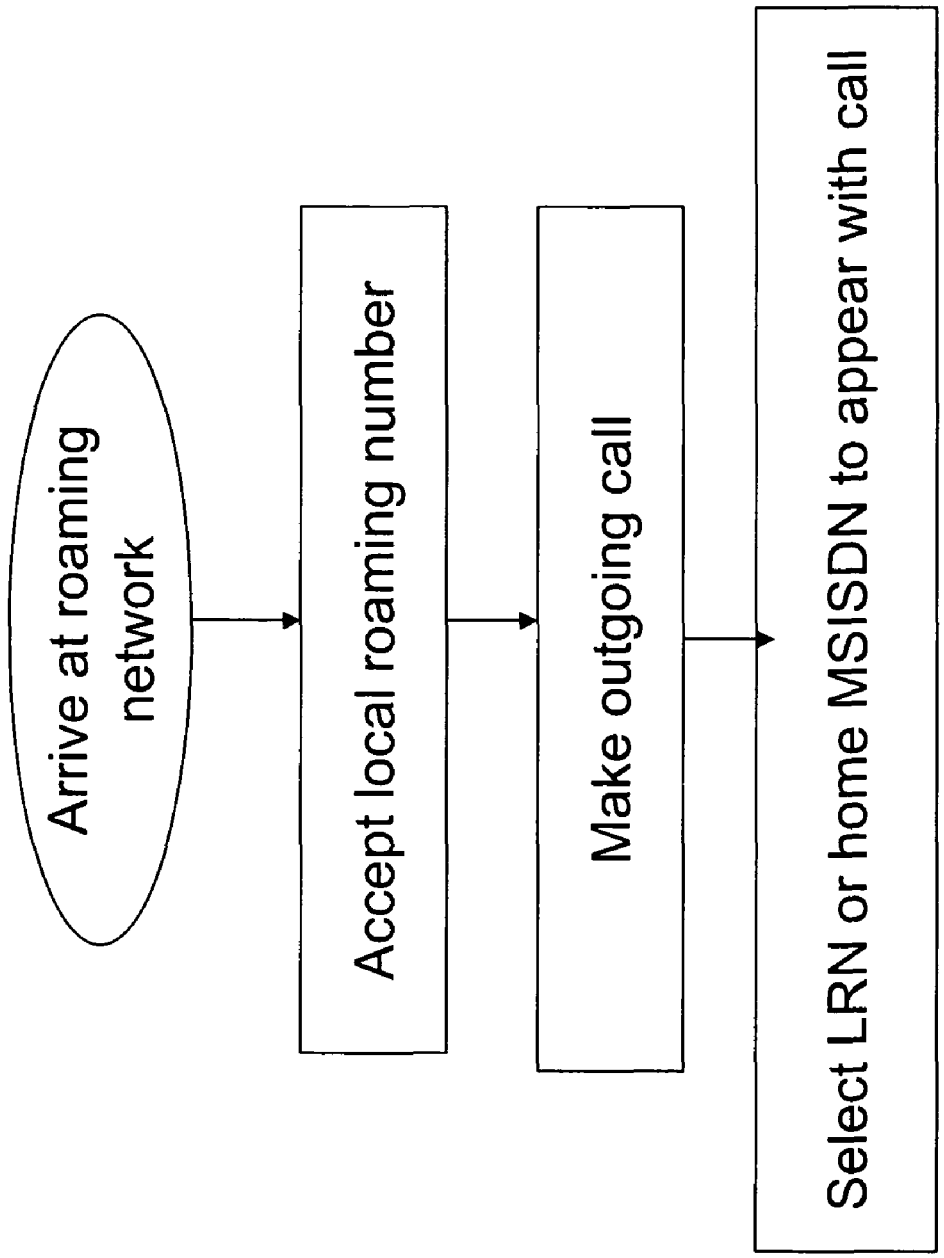
FIG. 3 is a flow chart illustrating the procedure that a roaming user takes in accepting a local number and then manually selecting which of his two numbers are to appear in a call notification according to a preferred embodiment of present invention.

Reference is now made to FIG. 3, which is a flow chart illustrating a method of operating a roaming mobile handset according to the present embodiments. The roaming mobile handset has its own home handset number or MSISDN. As the handset arrives at the roaming network it is offered a local number, the above-described LRN. The user either accepts or declines the offer. If he accepts the offer then he obtains the ability to accept calls from the roaming network without paying any charges at all, and may make calls to the roaming network for the cost of a local call. Now in effect the roaming handset has two numbers. Thus the question arises as to which of the two numbers is to be sent with outgoing calls to appear on the screen of the called party. The handset itself is only able to attach the MSISDN and the LRN is substituted in the network if desired.

As shown in FIG. 3, the user is able to select whichever of the two numbers he chooses when placing the call. As will be explained below, the choice may be made automatically using rules based on the type of call, or manually, say by entering a prefix to the handset number. Alternatively the manual choice may be made by responding to a prompt that is provided to the user. The prompt could be an on-screen prompt for an on-screen selection or it could be an IVR (Interactive Voice response) prompt provided by the network. Typically the user would wish other users in the roaming country to see his LRN, whereas users in other countries may as well see his home number MSISDN. A rule for setting the number could therefore be based on the type of call, with the user being able to override the rule. If the LRN is selected then a substitution is made of the call identifier over the network so that the recipient sees the LRN even though the MSISDN was initially sent.

The LRN of the present embodiments thus provides roamers with all the benefits of having a local number without the drawbacks of purchasing an additional SIM or a second handset.

Inbound roamers, upon registering in the operator's network, are dynamically allocated a local number or LRN to be associated with the roamer's handset while roaming in the network. Roamers can receive calls both on the original number (MSISDN) and on the new LRN. Calls from the roaming country made to the LRN are free as they are fully national calls.

As explained, when originating calls, the roamer may select the number or caller line identification (CLI) with which the call is to be identified on the recipient's screen. The mobile originated (MO) call can be identified with either the local roaming number itself or with the home CLI (MSISDN). By adding a prefix before the destination number when dialing, the call is identified with the local roaming number. Without the prefix or PBD, all MO calls are identified with the home MSISDN, as would have been the case anyway. The feature of the LRN enables the roamer to present a local presence while roaming.

Referring again to FIG. 1, and a number assignment unit 14 carries out the dynamic assignment of numbers from a reserved number range to newly appearing roaming users. A smart usage-based mechanism 16 is preferably provided, which reserves the same local number for future visits by the same roamer. Such a feature is useful for frequent visitors, who can now rely on the number and print business cards and like stationary based thereon. Even if the roamer is not a frequent visitor it is still advisable to reserve the number for a certain period after the visit, to avoid a new assignee of the number from receiving calls intended for the previous user. In a preferred embodiment a pre-set expiration date may be set for frequent users so that anyone who revisits say within a year can use the same number. Smart number reservation is thus advisable for all numbers assigned.

Specific users may be able to extend reservations of the number beyond this pre-set expiration date via Customer Care.

The way the number reservation feature would work from the point of view of the user would be that he would arrive a second time at a given country within say a year of his previous visit and would automatically receive the same LRN.

It is noted that the handset that is the subject of the LRN is required to remain within the specific cellular network that provided the number, since correct translation of the number is dependent on the translation unit or intelligent gateway of the given network. The service may thus be provided with the Out-Of-Service notification, which warns the roamer if and when he is transferred to another network that he should return to the issuing network if he wishes to continue benefiting from the LRN. There is thus provided an incentive for roaming users to remain with the same service provider. The roaming user may be encouraged to manually select the specific VPMN, using the manual network selection feature of the mobile handset. In this case, the handset remains in the same visited network as long as it can. Roaming users are regarded as particularly valuable customers, and frequent roamers are especially so, and the particular network provider is thus able to retain such valuable customers.

In summary, the LRN allows operators to offer better tariffs and tariff conditions for inbound roamers. They can thus attract and retain inbound roamers. Total control is available over charges for MO calls that use the LRN, so that involvement by the home network, or the need to share revenues with the home network is obviated. The operator is able to encourage more local network traffic since he makes cheap local calls more conveniently available to the roamer and the operator obtains a competitive advantage in the local market, inducing the roaming user to remain with him, and reducing chum.

The LRN service being available at the visited network also benefits the home operators, since the roamer no longer has any need to remove the home network SIM card or dispense with his original mobile handset altogether. Thus the home network still mediates mobile terminated (MT) calls, provides SMS messages, provides GPRS, MMS, VAS, etc, and of course to carry mobile originated MO calls to International and home destinations.

As a result, the service enables roamers to continue to be available on their home MSISDN and to enjoy all their familiar value added services.

Advantages also accrue to the roaming user, and to his local contacts in the roaming country. Thus roaming users save money when calling other roaming subscribers via their local number. A local presence is provided for frequent travelers by enabling them to be reached via a local number that they can print on their stationary. Local contacts can call them for the cost of a local call and these calls are received for no charge in most countries by the roamer. Roamers can make and receive calls via both the home and local numbers as appropriate. The LRN avoids the need to separately purchase, maintain and pay for a local number, and as mentioned the local number can be reserved for the roamer's future visits.

Connectivity

Figure 4:
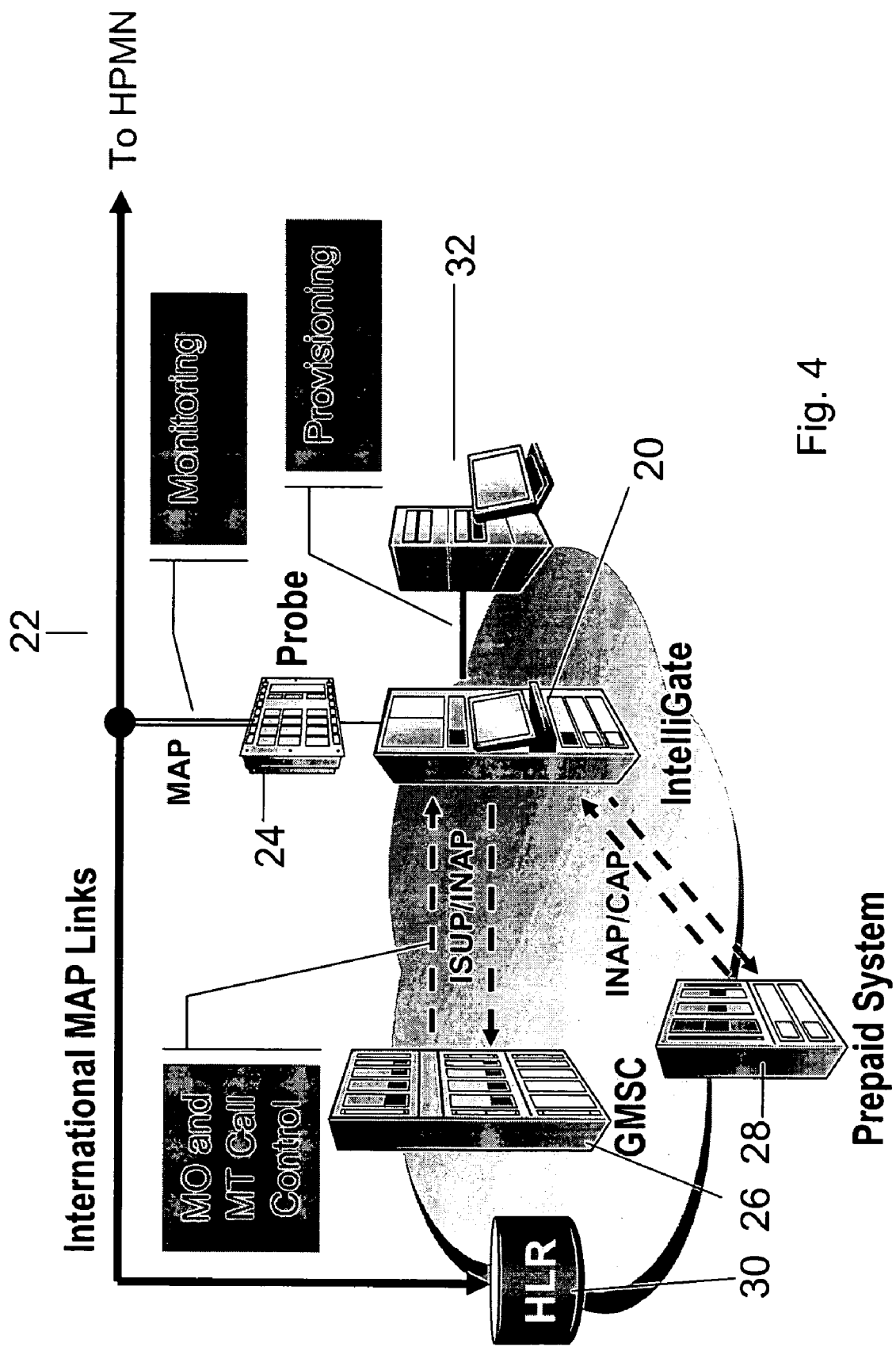
FIG. 4 is a simplified diagram illustrating the system of claim 1 in greater detail, and including prepaid features.

Reference is now made to FIG. 4, which is a simplified block diagram illustrating a system architecture and suitable interfaces for the Local Roaming Number service. The system involves an intelligent gateway 20 located on an International handset link 22 that links the home and roaming networks. A MAP probe 24 probes the International link and provides data of the International traffic to the Intelligent gateway 20. The intelligent gateway is connected to a general mobile switching center GMSC 26 and to prepaid system 28. HLR 30 at the home network knows the home handset number of its handsets. The HLR receives location updates based on that number and allows the locations of the handsets to be queried.

MSC Interface

The Local Roaming Number system, as shown in FIG. 4, is preferably based on the intelligent gateway 20, and can be integrated into the operator's network via GMSC 26 either as an ISUP service Node (ISUP), or as an intelligent network IN service control function.

A generic technical solution takes into account the above-mentioned two alternative ways of integrating the service, referred to below as signaling options. A final delivered solution is preferably adjusted to specific network configurations and parameters including the network size and topology, the traffic volume, the INAP vendor's variant, the CAMEL version—if relevant and the operator's preferences.

The two signaling options are described below.

ISUP

In particular cases, such as non-IN network environment and/or relatively low inbound roaming traffic, call control is performed using ISUP signaling.

The Intelligent Gateway 20 is connected to the MSC, as in this case, call control does not require connecting the Intelligent Gateway to the network via voice channels. SS7 signaling links are used, but specifically to convey the ISUP signaling. An inter-connection is achieved by utilizing a 'Loop-Around' technique on the MSC. The Loop-Around technique is one in which each individual call utilizes two ports on the MSC. The two ports are connected together (that is the loop) via a cable, to ensure that there is always a voice path between them. The Intelligent gateway uses the ISUP signaling to control the looped-around ports using standard ISUP messages.

Intelligent Network—IN

The Intelligent Gateway 20 controls MO and MT calls delivered to inbound roamers based on the known IN architecture and signaling protocols. The IN solution suits networks that are IN-ready and/or networks that experience relatively high inbound roaming traffic.

Using INAP, call control is performed with a combination of Trigger Detection Points and Event Detection points.

Probe Interface

MAP probe 24 or SS7 Mobility Probe connects the Intelligent Gateway to the operator's international SCCP signaling links in a completely passive mode, meaning it merely listens to and does not alter the signaling. The interface is used to obtain the relevant roamer's information and acts as a triggering point for service activation.

Provisioning Interface

A provisioning interface 32 is preferably provided to enable the operator to configure the behavior of the service. For example, provisioning interface 32 may allow the service provider to set qualification rules for a roamer to be provided with an LRN, or conditions under which the LRN may be used, as will be discussed in greater detail below. The interface 32 also allows the provider to view basic service status parameters.

Prepaid System Interface—Optional

Prepaid interface 28 allows the service to interact with an existing Prepaid system that accommodates users who pay for their handset usage in advance. The service uses this interface to manage accounts, charge calls and balance queries.

It is noted that the prepaid system interface 28 is merely optional. Without the prepaid interface the service can nevertheless be provided with regular roaming charges for MO calls.

Service Initial Stage—Service Activation

Figure 5:
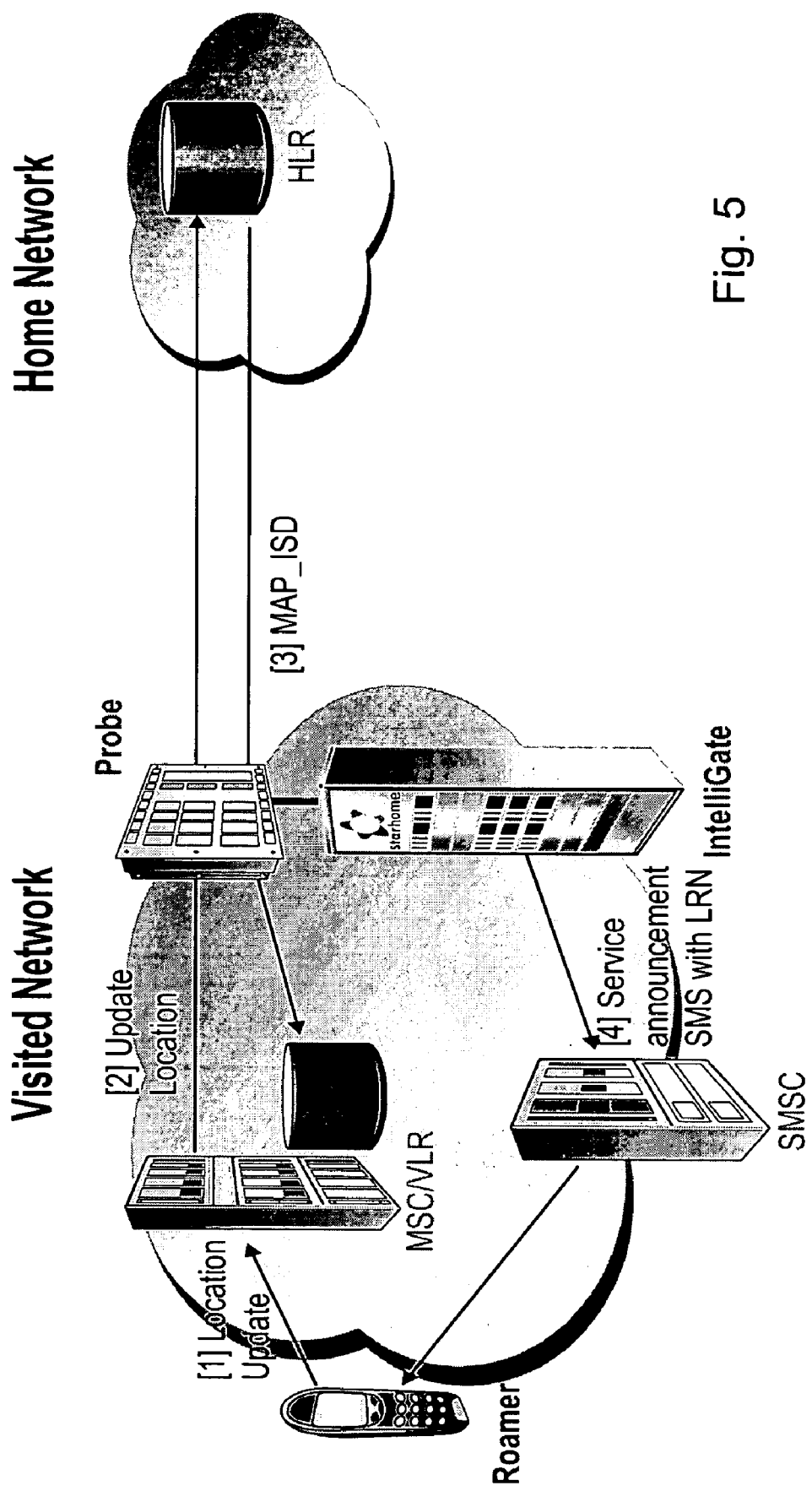
FIG. 5 is a simplified diagram illustrating system flow for service activation according to a preferred embodiment of the present invention.

Reference is now made to FIG. 5, which is a simplified diagram illustrating service activation flow for a new roamer recognized on the visited network. The initial state of the service is responsible for the roamers' registration and activation process to the service.

The roamer announces his presence at the roaming network by sending an update location message to his HLR 30. The HLR responds with a MAP ISD message. The intelligent gateway 20 monitors the traffic, assigns an LRN to the roamer and sends the roaming user an SMS message informing him of the allocation. This is summarized in table 1 below.

The activities carried out at the intelligent gateway include the following activities:
- Monitoring roamer's update location
- Obtaining subscriber information
- Service qualification process for each roamer
- Announcing service to roamers
- Monitoring roamer's cancel location and purge messages

TABLE 1

Initial Registration steps, Refers to FIG. 5.

| Step | Action |
| --- | --- |
| Steps 1 & 2 | The roamer registers his location from the visited network via MAP_UPDATE_LOCATION message to the HLR |
| Step 3 | The HLR responds with MAP_ISD (Insert Subscriber Data) |
| Steps 1 & 2 | The roamer registers his location from the visited network via MAP_UPDATE_LOCATION message to the HLR |
| Step 4 | The Intelligent gateway monitors the MAP_ISD message which triggers the service activation for this roamer. The Intelligent gateway also sends an SMS with the service announcement and the allocated local roaming number for this roamer. |

Service Qualification Process

After the Intelligent gateway has detected a Location Update by an inbound roamer, the qualification process needs to decide whether this inbound roamer is entitled or qualified for the service. There is no point, for example, providing the service to someone who it will be difficult to bill afterwards.

The qualification process decides if the roamer is allowed to originate and receive calls on the local number by testing values in the MAP_ISD message.

CAMEL Triggers

Inbound roamers with CAMEL triggers are in many cases prepaid roamers, which means that their charging and billing is done in real-time in their home network (HPMN). The Local Roaming Number service preferably identifies CAMEL enabled roamers and provides visited network operators with three levels of service for those CAMEL subscribers:

1. NO Service—once a CAMEL enabled inbound roamer is detected the service will not allocate a local number and the service will be barred for this roamer.

2. MT Only service—this options enables the operator to offer a limited service for CAMEL enabled inbound roamers and allowing roamers to receive calls and SMS on their local number—this option preserves the attraction of roamers into the network since local callers can call them at local rates, and yet the fact that they cannot be billed is irrelevant.

3. Full Service—MT and MO service preserving the charges for MO calls (with the HPMN or a local prepaid system interface) while providing a complete service. This option requires the integration of an IN service broker to enable the charges to be preserved and transferred to the home network. The broker service may be incorporated into the intelligent gateway.

Barring Supplementary Services Information

Certain users may have barring information. The operator may decide not to provide the service to inbound roamers with MO barring information. The barring of MO calls may indicate that the inbound roamer is a prepaid roamer not allowed to originate calls.

If the operator decides to provide the service to barred inbound roamers, the only way to charge these roamers is by providing them with a local prepaid account. Providing inbound roamers with a local prepaid account and local charges for MO calls is an add-on feature that may be offered to such roaming customers.

Service Announcement SMS

Figure 6:
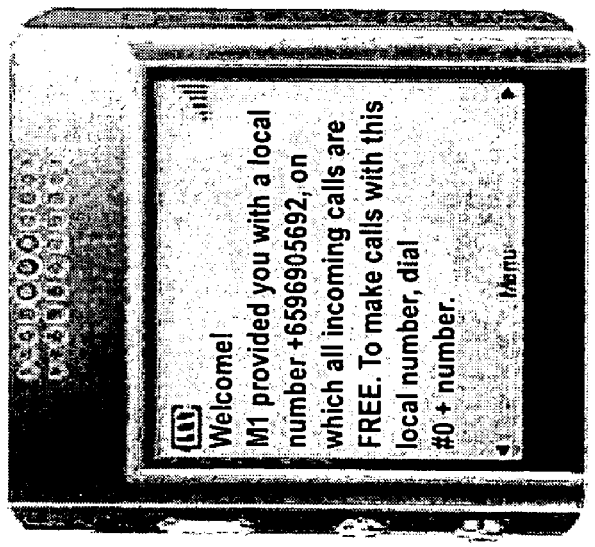
FIG. 6 is a simplified diagram illustrating a screen of a mobile handset illustrating an SMS message offering a service according to a preferred embodiment of the present invention.

Reference is now made to FIG. 6, which is a screen shot of a mobile handset showing an SMS.

The Service Announcement SMS promotes the service to inbound roamers and supplies information about the service. An example of such an announcement is the message shown in FIG. 6.

The following capabilities are configurable by the operator:
- The announcement message can be delayed for a specified amount of time after registration to the visited network, and values may be provided in minutes.
- The announcement supports multiple languages and provides automatic best-match logic between the home country and the supported languages, in cases of no match, a default language is activated.
- The message can include parameter fields which can be replaced with actual values before sending of the message
- Local Roaming Number—the allocated LRN
- A different message can be sent, if desired, to returning roamers receiving the same LRN as in their previous visit. This message is called a Return User Notification.

Out-of-Service Announcement SMS

As mentioned above, the LRN preferably only works when the roamer is within the network that assigned the number and not when he joins one of the competing networks. An Out-of-Service Announcement SMS enables the operator to alert inbound roamers who switch to another network within the same country about the loss of their Local Roaming Number service. The message may notify the roamers as to how to switch back to this visited network.

The following capabilities are configurable by the operator:
- A parameter to send the Out-of-Service announcement only if the Local Roaming Number has been used at least once (MO or MT) within the present or any previous visits.
- The announcement message can be delayed for a specified amount of time after registration to another visited network. Values are given in minutes.
- The announcement supports multiple languages and provides automatic best-match logic between the home country and the supported languages, In case of no match a default language is activated.
- The message can include parameter-fields to be replaced with actual values before sending of the message.

Mobile Terminated Call Flow

Figure 7:
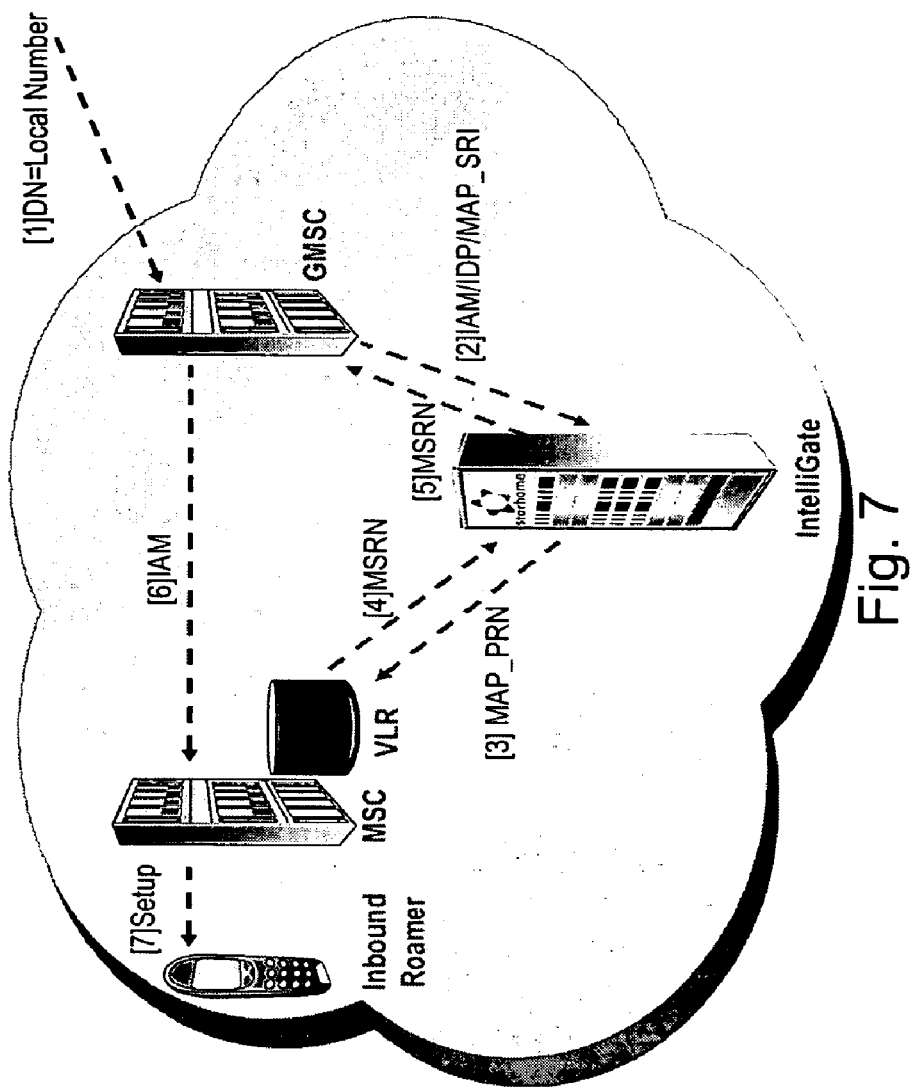
FIGS. 7-11 illustrate system flow according to further preferred embodiment of the present invention.

Reference is now made to FIG. 7, which represents the call flow for mobile terminated calls, when a local roaming number is used to reach inbound roamers.

In FIG. 7, a mobile terminated (MT) call arrives at the operator's-GMSC, and the call's dialed number is recognized as a local roaming number, because it is within a specified range that has been set aside for such numbers. The GMSC is configured to send all calls with a dialed number in this specified range to the Intelligent gateway via INAP_IDP or ISUP_IAM or MAP_SRI signals. The Intelligent gateway sends a MAP_PRN signal to the serving VLR, the handset's location, which information is taken from the MAP_ISD monitoring. The serving VLR returns a MAP_PRN_ACK signal with the MSRN. The Intelligent gateway diverts the call via the MSRN to the inbound roamer—using INAP_CONNECT(MSRN), ISUP_IAM(MSRN) or MAP_SRI_ACK(MSRN) signals.

TABLE 2

Call Flow for Mobile Terminated Calls, refers to FIG. 7

| Step 1 | A mobile terminated (MT) call arrives at the operator's-GMSC, the call's dialed number = local roaming number |
|---|---|
| Step 2 | The GMSC is configured to send all calls with a DN in a specified range to the Intelligent gateway via INAP_IDP or ISUP_IAM or MAP_SRI |
| Step 3 | The Intelligent gateway sends MAP_PRN to the serving VLR (taken from the MAP_ISD monitoring) |
| Step 4 | The serving VLR returns MAP_PRN_ACK with the MSRN |
| Step 5 | The Intelligent gateway diverts the call via the MSRN to the inbound roamer - using INAP_CONNECT(MSRN), ISUP_IAM(MSRN) or MAP_SRI_ACK(MSRN). |
| Steps 6 & 7 | The GMSC sends the call via the MSRN to the serving MSC and the mobile handset |

Called Party Notification

When a call is received, the called party (B-Party) may like to know that the caller (A-party) has used the Local Roaming Number to make this call, and not the home MSISDN.

The service offers two methods of dialed number identification for MT calls:

Marking the CLI for incoming calls—with a special indication, such as: "#" or "*" or another special character, so that the called party can tell that the caller has used the Local Roaming Number.

Optional: In-band tone—After "ANSWER", the service plays a special tone to the called party to identify the call as a Local Roaming Number call.—This is the least preferred method as it requires additional resources for playing the tone.

Mobile Terminated Calls—Billing

Telephony services are billed using call data records (CDR). Now, if the LRN service includes free-of-charge MT calls, the CDRs for these calls are not needed. The VPLMN thus preferably filters out such CDRs for mobile terminated calls, MTCDRs so that they are not passed on to the roamer's home network HPLMN.

It is noted that if local MT charges apply in the VPMN, the visited operator preferably provides the service with a local prepaid account. As mentioned above, providing inbound roamers with a local prepaid account is an additional feature in the Local Roaming Number Service.

Mobile Terminated Calls—Optional Use of INAP

The INAP specification, developed and marketed by Nokia of Finland, enables some additional call flows that can improve the service functionality. This usage is additional to all that is explained above.

In INAP the visited network's mobile switching center VMSC arms a trigger for all MT calls (calls to the MSRN), to send an IDP to the Intelligent gateway.

When the IDP reaches the Intelligent gateway, it preferably performs the following:

If the call's MSRN does not match an MSRN allocated by the LRN services, meaning it is a regular MT call in the network, the intelligent gateway sends a Continue message.

Otherwise the call is an LRN call and a. The Intelligent gateway sends a Furnish Charging Information message, indicating that the MT CDR should be treated differently by the customer's billing. The indication enables the operator to filter out these CDRs more easily.

b. The Intelligent gateway sends a Connect message, NOT modifying the called party (MSRN), but deactivating the B Party's call forwarding for this call, using the gsmSupplementaryServiceControl parameter.

Mobile Terminated SMS Flow

Figure 8:
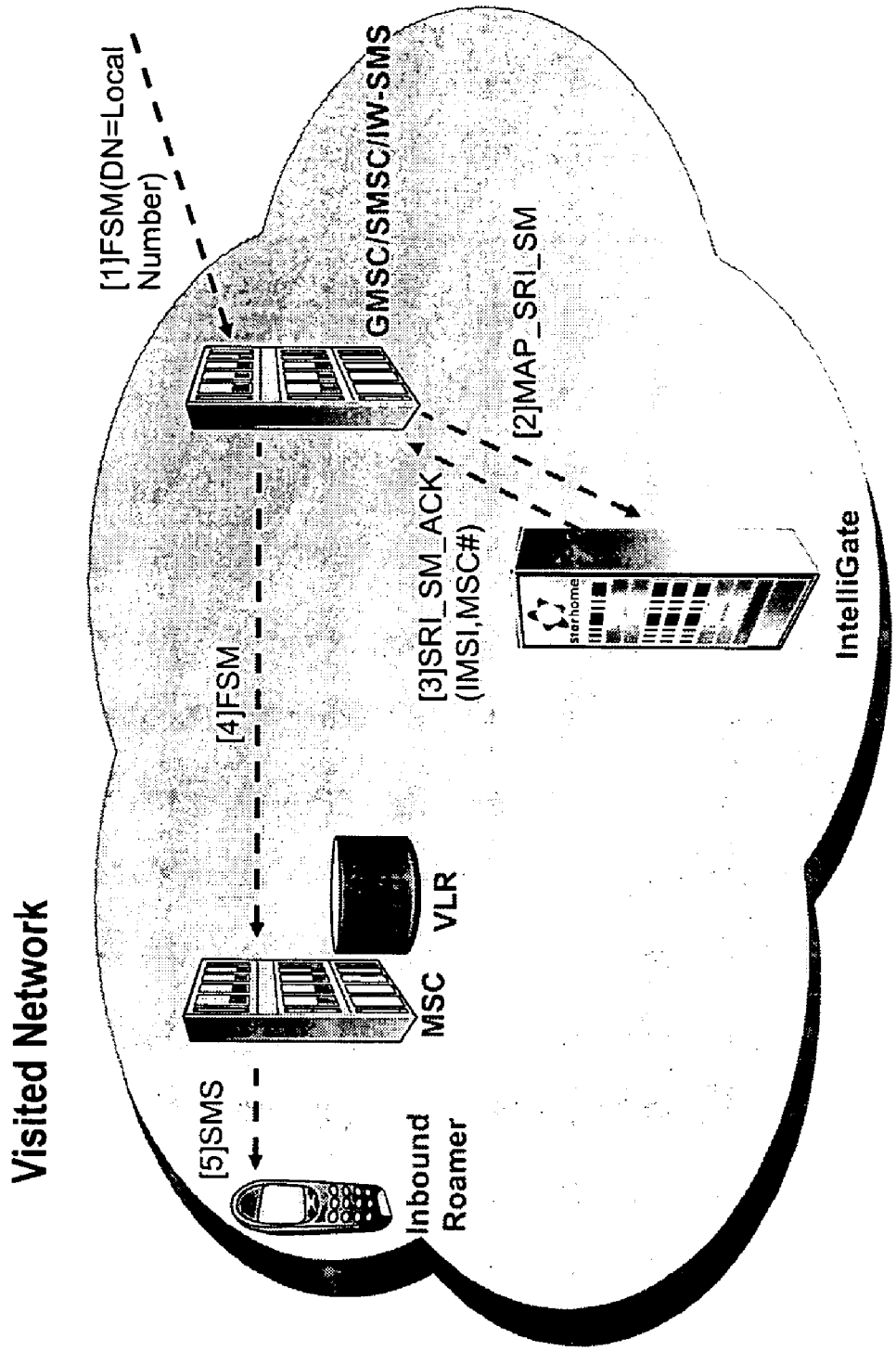

Reference is now made to FIG. 8, which is a simplified flow chart indicating operation of the flow for a mobile terminated SMS sent to a Local Roaming Number. A mobile terminated (MT) SMS arrives at the operator's Inter-working SMSC (or GMSC or SMSC), and the destination number is a local roaming number. The Intelligent gateway is configured to provide the substitute HLR for all Local Roaming Numbers, as explained above, and thus the Inter-working SMSC sends the MAP_SRI_SM signal to the Intelligent gateway. The Intelligent gateway returns the MAP_SRI_SM_ACK signal with the IMSI and service MSC address. The Inter-working SMSC forwards the SMS to the serving MSC via MAP_FSM (Forward Short Message), and finally the short message is sent to the handset. The above is summarized in table 3 below.

TABLE 3

Sending an SMS having an LRN as dialed number to a handset

| Step | Action |
|---|---|
| Step 1 | A mobile terminated (MT) SMS arrives to the operator's Inter-working SMSC (or GMSC or SMSC), the destination number = local roaming number |
| Step 2 | The Intelligent gateway is configured as the HLR for all Local Roaming Numbers thus the Inter-working SMSC sends MAP_SRI_SM to the Intelligent gateway |
| Step 3 | Intelligent gateway returns the MAP_SRI_SM_ACK with IMSI and service MSC address |
| Step 4 | The Inter-working SMSC forwards the SMS to the serving MSC via MAP_FSM (Forward Short Message) |
| Step 5 | The short message is sent to the handset |

Mobile Terminated SMS—Billing

No billing issues are raised for Mobile terminated SMS, as short messages are free of charge to the recipient. There is thus no HPMN involvement. It is noted however that if local MT SMS charges apply in the VPMN, the visited operator must provide the service with a local prepaid account. Again, as mentioned, providing inbound roamers with a local prepaid account is an additional feature of the Local Roaming Number™ Service.

Mobile Originated Call Flow

Figure 9:
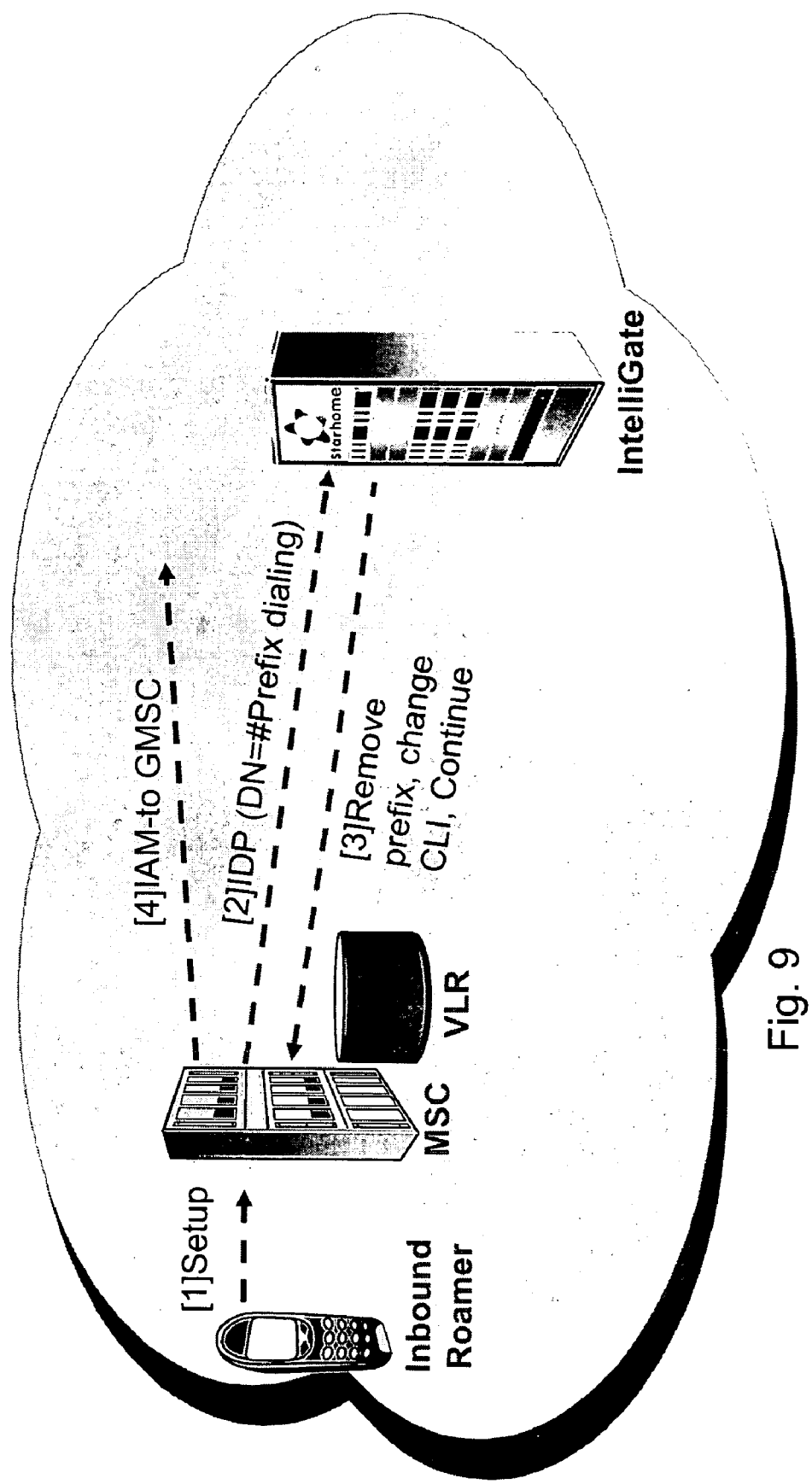

Reference is now made to FIG. 9, which is a flow chart showing the call flow for mobile originated calls using a local roaming number. The caller (inbound roamer) may choose the CLI, local or home number, to be used in the next call by adding a prefix to the dialed number, as explained hereinabove.

Caller Line Identification (CLI) Replacement Mode

Manual CLI Selection

When the service is configured with "Manual CLI Selection" all MO calls are generated with the Home MSISDN to appear on the called party's screen unless the roamer adds a predefined prefix before the dialed number. Adding such a prefix replaces the original CLI with the new local roaming number. The prefix may be added by being explicitly dialed, by pressing in response to an on-screen prompt or in any other way.

Automatic CLI Selection

In an automatic CLI selection embodiment, the CLI selection is done automatically according to the call's destination. All calls to local destinations preferably carry the local roaming number, while calls to international destination preferably carry the home MSISDN as their CLI.

Such an option may be combined with a prefix dialing which overrides the automatic selection and forces CLI replacement for the following call regardless of the destination.

Mobile Originated Calls—with Home MSISDN

Mobile Originated calls from the Home MSISDN have a regular MO call flow with no changes. The call is first handled by the serving MSC and is then routed by the dialed number. In the automatic CLI selection embodiment all Mobile-Originated calls generated by inbound roamers are preferably handled by the Intelligent Gateway and the Local Roaming Number service.

Mobile Originated Calls—with Local Roaming Number

With reference to FIG. 9, the call flow shown therein demonstrates how the Local Roaming Number is presented as the Caller ID for specific MO calls made by the inbound roamer. An inbound roamer originates a call towards the serving MSC with a prefixed dialed number. The call may be to a local or an international destination. The call may be dialed with a prefix, or the prefix may be added automatically as explained above. If so, the prefixed call is handed by the MSC to the Intelligent gateway via INAP_IDP or ISUP_IAM. Only calls with a specific service prefix (e.g. "#") are handed to the Intelligent Gateway, and other MO calls are handled in the regular way.

The Intelligent gateway checks the service qualification for the caller. If qualified, then the Intelligent gateway removes the prefix. The prefix can be removed by the serving MSC before handing the call, and the effect is to change the CLI to the Local Roaming Number. The call is sent back to the original destination, only now with the modified CLI. The MSC sends the call to the destination based on the dialed number and without the prefix, which has now served its purpose and is thus redundant.

TABLE 4

Mobile Originated Call flow, refers to FIG. 9

| Step | Action |
|---|---|
| Step 1 | An inbound roamer originates a call towards the serving MSC with a prefixed dialed number (to local or international a destination) |
| Step 2 | The prefixed call is handed by the MSC to the Intelligent gateway via INAP_IDP or ISUP_IAM. Only calls with a specific service prefix (e.g. "#") will be handed to the Intelligent gateway, other MO calls will be handled in the regular way. |
| Step 3 | The Intelligent gateway checks the service qualification for the caller. If qualified, then the Intelligent gateway removes the prefix (the prefix can be removed by the serving MSC before handing the call), changes the CLI to the Local Roaming Number and sends the call back to the original destination (only now with the modified CLI) |
| Step 4 | The MSC sends the call to the destination based on the dialed number (without the prefix) |

Mobile Originated Calls—Billing

The local roaming number service is designed to interference with standard billing and charging processes. For those Mobile Originated calls with home MSISDN without any prefix no changes are required to the billing process. However, for MO calls based on the local roaming number, irrespective of whether they are with prefix or automatic, the preferred embodiments offer two mutually exclusive billing methods.

In one variation, the serving MSC generates CDRs in the regular way and provides one of the following two options:

Removal of the service prefix before generating the CDR

When using an Intelligent network (IN), the Intelligent gateway can send IN_FurnishChargingInformation to mark the CDR for later CDR processing.

In the alternative billing method, the Intelligent gateway generates CDRs for MO calls to be transferred to the billing GW for processing at a later time.

Mobile Originated SMS—Using Map Relay

Figure 10:
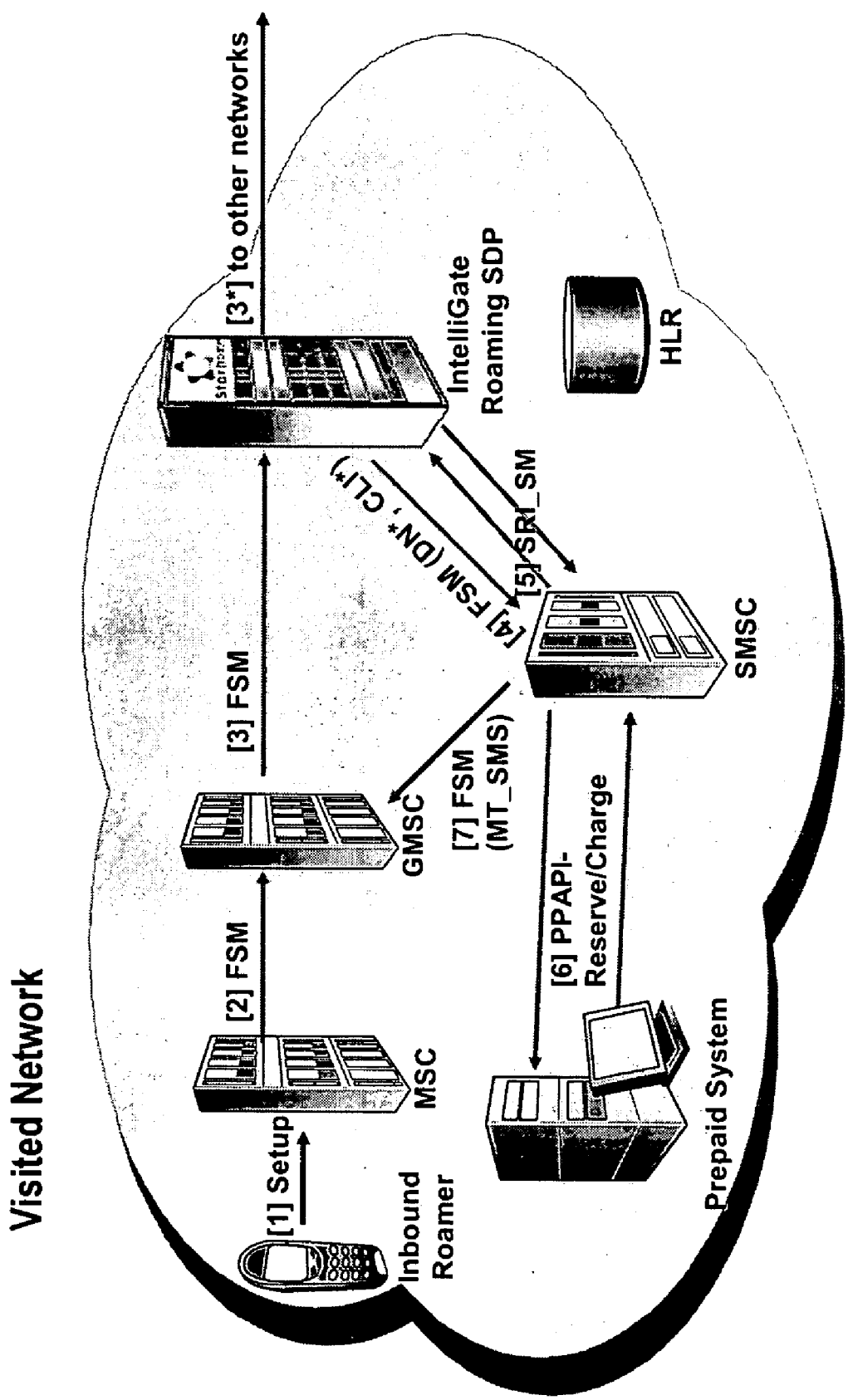

Reference is now made to FIG. 10, which is a simplified flow chart illustrating the flow in an embodiment in which the Intelligent Gateway functions as a Signaling Relay Module to intercept the MO SMS on its way to the home SMSC and thus functions as the HLR for the local roaming numbers.

As shown in FIG. 10, an inbound roamer originates an SMS towards the home SMSC with a prefixed dialed number, which may be to a local or international destination. The SMS is intercepted by the signaling relay module in the Intelligent gateway, which removes the prefix and changes the CLI. The Intelligent gateway forwards the SMS to the local SMSC for further handling—sending the message to its destination with the new CLI.

The Intelligent gateway acts as the HLR for all MSISDNs allocated for Local Roaming Number service. The SMSC sends a MAP_SRI_SM signal to the Intelligent gateway which may relay the query to the actual HLR to locate the called or B-Party.

The SMSC charges the caller or A-Party for the SMS being sent from the local account, and the SMSC sends the SMS to its destination via MAP_FSM to the GMSC.

TABLE 5

Mobile-Originated SMS with Local Prepaid Account - refer to FIG. 10

| Step | Action |
|---|---|
| Steps 1, 2 & 3 | An inbound roamer originates an SMS towards the home SMSC with a prefixed dialed number (to local or international a destination) |

TABLE 6.5

Mobile Originated SMS - FIG. 10

| Step | |
|---|---|
| Step 3* | The SMS is intercepted by the signaling relay module in the Intelligent gateway, which removes the prefix and changes the CLI |
| Step 4 | Intelligent gateway forwards the SMS to the local SMSC for further handling - sending the message to its destination with the new CLI |
| Step 5 | Intelligent gateway acts as the HLR for all MSISDNs allocated for Local Roaming Number service. The SMSC sends MAP_SRI_SM to Intelligent gateway which may relay the query to the actual HLR to locate B-Party |
| Step 6 | The SMSC charges A-Party for the SMS sending from the local account |
| Step 7 | The SMSC sends the SMS to its destination via MAP_FSM to the GMSC |

Mobile Originated SMS—Using in Triggers

Figure 11:
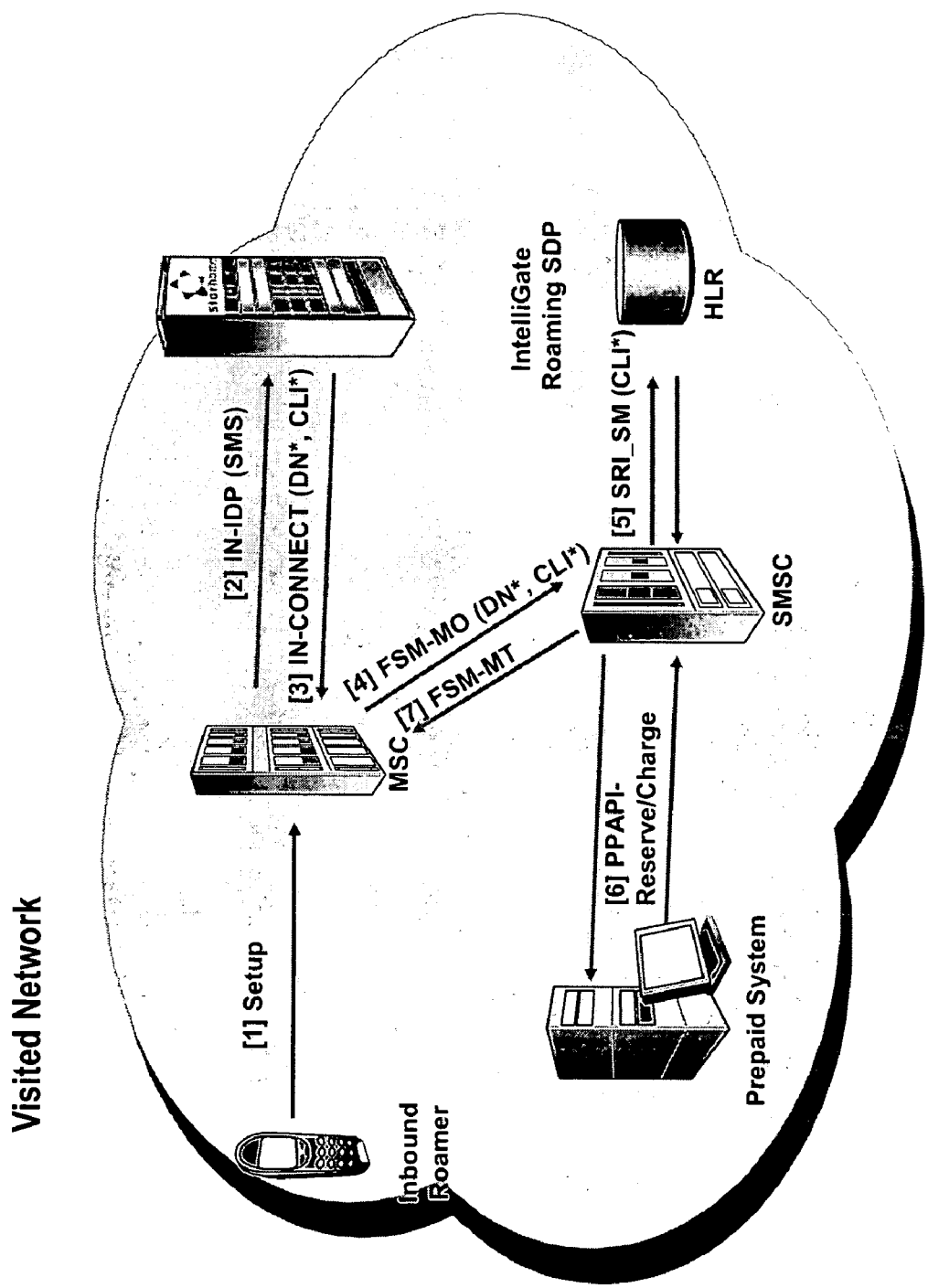

Reference is now made to FIG. 11, which shows the flow in an embodiment in which the Intelligent gateway functions as an SCP to intercept the MO SMS on its way to the home SMSC and as the HLR for the local roaming numbers.

An inbound roamer originates an SMS towards the home SMSC with a prefixed dialed number, which may be to a local or international destination as desired.

The serving MSC has a CAP Phase 3 trigger for MO-SMS. The CAP triggers are preferably inserted offline and this point is discussed in more detail hereinbelow.

The MSC sends an Initial DP SMS (IDP) message to the Intelligent gateway or gates acting as an SCP. The Intelligent gateway send a Connect SMS message back, removing the prefix from the destination Address and modifying the Calling Number to that of the local LRN number of the user.

In addition, the Intelligent gateway modifies the SMSC Address, to route this SMS to the local SMSC.

The MSC forwards the SMS to the local SMSC for further handling.

The Intelligent gateway acts as the HLR for all MSISDNs allocated for Local Roaming Number service. The SMSC sends the MAP_SRI_SM to the Intelligent gateway which may relay the query to the actual HLR to locate the called or B-Party The SMSC charges the caller or A-Party for the SMS since it was sent from the local account.

The SMSC sends the SMS to its destination via MAP_FSM to the GMSC.

TABLE 6

| Intelligent Gateway as SCP, corresponds to FIG. 11. | |
|---|---|
| Step | Action |
| Step 1 | An inbound roamer originates an SMS towards the home SMSC with a prefixed dialed number (to local or international a destination) |
| Step 2 & 3 | The serving MSC has a CAP Phase 3 trigger for MO-SMS (the CAP triggers was inserted offline. The MSC sends an Initial DP SMS (IDP) message to the Intelligent gateway's, acting as an SCP. The Intelligent gateway send a Connect SMS message back, removing the prefix from the destination Address and modifying the Calling Number to the local LRN number of the user. In addition, the Intelligent gateway modifies the SMSC Address, to route this SMS to the local SMSC. |
| Step 4 | MSC forwards the SMS to the local SMSC for further handling. |
| Step 5 | Intelligent gateway acts as the HLR for all MSISDNs allocated for Local Roaming Number service. The SMSC sends MAP_SRI_SM to Intelligent gateway which may relay the query to the actual HLR to locate B-Party |
| Step 6 | The SMSC charges A-Party for the SMS sending from the local account |
| Step 7 | The SMSC sends the SMS to its destination via MAP_FSM to the GMSC |

Mobile Terminated MMS Flow

The Mobile Terminated MMS flow is identical to the Mobile Terminated SMS flow above, since the MT MMS is delivered as a binary SMS to the called or B-Party. Therefore the MMS flow is not discussed separately.

Mobile Originated SMS with INAP—Billing

Using the above method the inbound roamer is charged normally for originating an SMS while roaming, without the need for a local prepaid account, or any need to change any roaming agreements or to coordinate with the caller or A-party's home network.

Number Allocation Logic

Local Roaming Number Usage

Network management requires monitoring, capacity allocation and prediction. The system preferably defines logic states, say time thresholds, based on individual roamer's usage figures. The usage figures may typically be calculated as average calls (both MO and MT) per visit-day.

If a certain local number is not used at all, then both reservation and cooling period values are 0 (zero) and the number is immediately returned to the pool.

The calculation of a usage upper value is based on the following formula:

$$\text{Usage Factor} = \frac{\sum \text{Accumulated Number Of Calls}}{\sum \text{Accumulated Visit Period}}$$

Where:

Accumulated Number of Calls: the accumulated figure of all calls received and originated with the local roaming number on all visits until now Accumulated Visit Period: the accumulated figure for the total number of days of all previous visits until now.

The individual user can be assigned a category (the above logic state) according to his usage level, for example as per table 7 below.

TABLE 7

User type by usage level. Sample values are typically configurable via service provisioning

| Type | Usage upper value | Reservation Period (days) | Cooling Period (days) | Send "end-of-reservation" Notification |
|---|---|---|---|---|
| Ivory | 0-0.1 | 0 | 0 | No |
| Bronze | >0.1-1 | 60 | 45 | No |
| Silver | >1-5 | 60 | 60 | No |
| Gold | >5-10 | 90 | 60 | Yes |
| Platinum | >10 | 90 | 90 | Yes |

Local Roaming Number Lifecycle

Figure 12:
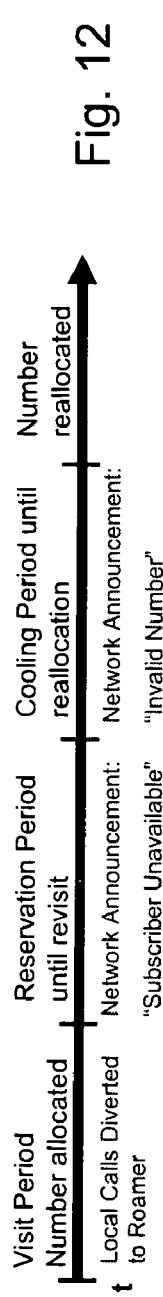
FIG. 12 is a time line illustrating a cycle in the life of a local roaming number according to a preferred embodiment of the present invention.

Reference is now made to FIG. 12 which is a time line illustrating the lifecycle of a local roaming number. As mentioned, a local roaming number once used, cannot immediately be reallocated. By the same token repeat users preferably have their numbers reserved for them.

A roamer who has used the local roaming number is entitled to longer reservation and cooling periods than a roamer who has not used the number at all.

As the allocation of local numbers is dynamic, the system may encounter low availability of local roaming numbers for allocation. In this case a handling procedure is preferably entered into.

Figure 13:
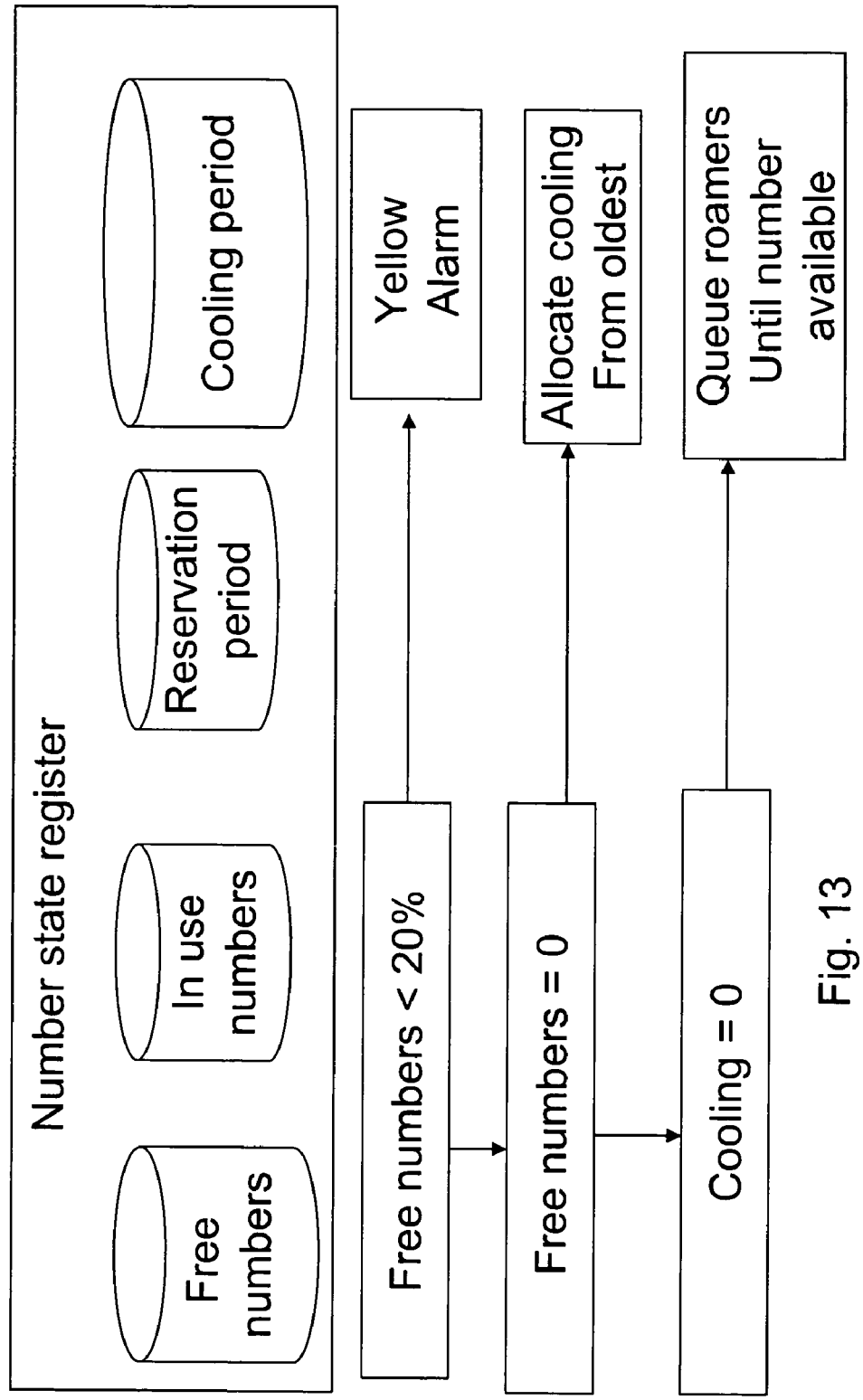
FIG. 13 is a schematic diagram illustrating number management according to a preferred embodiment of the present invention.

Reference is now made to FIG. 13 which illustrates an exemplary handling procedure.

A yellow alarm is triggered at 80% allocation of the numbers reserved for local roaming.

A red alarm is triggered at 100% allocation of the numbers, and in the red state, the system begins to reuse numbers in the cooling period from the oldest to the newest.

After all numbers in the cooling period have been reused, no new numbers are allocated or assigned to arriving inbound roamers.

Arriving inbound roamers are queued for available numbers, and each number returning to the pool is immediately assigned to the first roamer in the queue.

Visit Period

For the purpose of the usage and cooling period calculations, the visit period is calculated from the first update location monitored within the visited network until expiration of "day after end-of-visit" parameter, as explained below.

Reservation Period

The number reservation period is preferably calculated from the "end-of-visit" until the defined period of time (in days) for the roamer's type, as explained below.

Cooling Period

The cooling period is calculated from the end of the reservation period until the defined period of time (in days) for the roamer's type.

Required Number of Local Roaming Numbers

It will be appreciated from the above that a reasonable quantity of numbers needs to be set aside for a roaming local number service to succeed. In the following is explained a method for calculating the required amount of local roaming numbers in a network as a function of the number of inbound roamers.

TABLE 8

Parameters for calculating the required number of local roaming numbers

| Parameter Name | Meaning |
| --- | --- |
| CIR | Number of concurrent inbound roamers |
| AVD | Average visit duration in days |
| DUE | Days until end-of-visit - number of days since last update-location until the system decides that the roamer has ended the visit |
| ULR | Used LRN rate - the percentage of roamer who have used (MO or MT) their Local Roaming Number |
| RSP | Reservation Period |
| CLP | Cooling Period |

Number of local roaming numbers for first visit periods:

(CIR/AVD)×(AVD+DUE)

Number of allocated local roaming numbers for reservation and cooling periods:

((CIR/AVD)×ULR)×(RSP+CLP)

Total required Local Roaming Numbers:

(CIR/AVD)×(AVD+DUE)+((CIR/AVD)×ULR)×(RSP+CLP)

The following is a simplified example for the calculation of maximum allocation, wherein all of the roamers are platinum roamers as per table 7:

CIR=10,000 concurrent roamers
AVD=4 days
DUE=2 days
ULR=0.05 (5%)
RSP=90 days
CLP=90 days (10000/4)×(4+2)+((10000/4)×0.05)×(90+90)=37500 local roaming numbers required.

Procedure for an End of Reservation Notification

At the end of the reservation period, the system preferably sends an automated notification to a former inbound roamer notifying about the reservation period expiration. The message may include instructions to call Customer Care and extend the reservation period or instructions for self provisioning of the reservation period.

MT Calls—when Roamer not Connected to Network

This section focuses on the service when an inbound roamer is not connected to the visited network. At this point the allocated number is placed in the Reservation Period category. The various options outlined below enhance both the caller experience and the service to the inbound roamers when the roamers are absent.

Release Call—Status of Local Roaming Number

The network may provide the caller with an accurate notification about the status of the roamer with the Local Roaming Number. If the network fails to page the roamer the following applies:

During the visit and the reservation period, the service releases the call with a "subscriber is not available" notification release cause.

During cooling period, the service releases the call with a "number is invalid" notification release cause.

Missed Call Notification SMS

In a preferred embodiment, the service preferably sends an SMS with the missed call details to the home MSISDN. The message includes the caller identification, if such is provided by the network, and the call time stamp.

The missed call notification feature can benefit the HPMN by generating international traffic from the now former at his home or another roaming network, back to the caller.

Divert Calls to Home MSISDN

In a preferred embodiment the system enables inbound roamers to continue to receive calls on both MSISDNs, even if they are not connected to the VPMN. With this option, the inbound roamer is charged for the forwarded leg. Charging can be done using the standard methods known in the art including:

Local Prepaid account
Inbound roamer's Credit Card
Other payment methods: Paypal, etc.

Out-of-Serving Notification

When an inbound roamer with an active Local Roaming Number has left the visited network that assigned the number to roam in a competitor's network in the same country, the service can be configured to send an "Out-of-service" notification SMS. The SMS notifies the roamer that the Local Roaming Number is not available anymore. The notification preferably directs or encourages the roamer to manually select the correct network so that the local roaming number remains in use.

Local Roaming Number Recovery

A function may be provided to retrieve the last roaming number for a roamer.

The response to the function preferably returns the following details:
Last allocation date (or last date in-use)
The home MSISDN the number was last allocated to
Number current allocation status: in-use, reserved, cooling, free
Days until end of current status period (free=unlimited)
Number was used by roamer: Yes/No
Reservation Period Query
A function may be provided to retrieve the number of days until the end of the reservation period by the roamer's Home MSISDN or Local Roaming Number. The function preferably also returns the number of days in the cooling period for the roamer. Both values—reservation and cooling—are based on the roamer's type.

Reservation Period Extension
A function is preferably provided to enable customer care representatives to extend the reservation period for a roamer.
The extension values are provided in days. A (−1) value represents an unlimited extension and this is effectively a permanent allocation of a Local Roaming Number to an inbound roamer.

Exclusion of Roamer from Service
An inbound roamer may contact Customer Care and ask to be excluded from the service permanently or for the current visit View List of Roamers Excluded from Service
A function may be provided to return a list of all the excluded-by-request roamers.

Renew Local Roaming Number for Roamer
A renewal function may be provided to allocate a new local roaming number for a roamer through the home MSISDN
This function can be used after a roamer has requested to be excluded from the service, thereby having the affect of removing the roamer from the excluded list.
This function can be used when the roamer requests the current local roaming number be replaced. The previous local roaming number, if used, starts a "Cooling period" before being returned to the available pool. If the previous local roaming number was not used, then it can be returned to the available local roaming number pool immediately.

Local Roaming Number Recovery
Local roaming number recovery is a function that enables inbound roamers to recover the last local roaming number allocated for their own home MSISDN.

Reservation Period Query
A reservation period function may be provided which enables inbound roamers to query how many days are left for their reservation period. Preferably the function allows roamers to query their reservation period from any network, and not just the VPMN that has provided them with the local roaming number.

Self Provisioning User Interface
In one embodiment a self provisioning user interface is provided which may allow the possibility of the roamer carrying out self-provisioning for the service without the need to contact the local Customer Care representatives.
The interface may be a WAP or Web based interface for self provisioning that will allow roamers to customize their own settings.
Authentication is provided via username (home MSISDN) and password login.
The password is provided, on-the-fly, via SMS to the home MSISDN. In an embodiment, SMS and USSD interfaces may be provided to the self provisioning interface to address market segments where these access methods are deemed more acceptable.

External Systems Provisioning Interface
In one embodiment, a Simple Object Access Protocol (SOAP) based interface is provided. The SOAP interface allows connectivity of the service to existing CRM systems and other provisioning systems.

Billing Processes
The following discusses in greater detail the billing and CDR aspects of providing a local roaming number. In the case of local roaming, the user generally carries out the entire call transaction without reference to his home network. Thus billing aspects need to be sorted out independently of the home network, even though the user is billed through his home user account in most cases.

Billing—when Serving MSC Generates CDRs
If billing is carried out using the regular CDRs generated by the service MSC, the Intelligent gateway can add additional information to the CDRs by using Furnish Charging Information. This applies to INAP/CAP operation, in which INAP is used for Call control.

Billing—when Intelligent Gateway Generates CDRs
When the Intelligent gateway generates the CDRs locally, it sends them periodically to a specified location for further processing by the operator.

Communities Configuration
HPMN Blacklist
A blacklist of HPMNs to whose respective outbound roamers the service will not be available may be integrated into the system. Roamers from these networks will only be able to receive the service, if they have specifically requested to opt-in via Customer Care.

CAMEL Roamers
A configuration for CAMEL-based roamers may be set as an automatic community built from inbound roamers with CAMEL subscription records in their MAP_ISD message MO-Barred Roamers
An automatic community may be set up from inbound roamers with a barring supplementary Services activated record in their MAP_ISD message IMSI List
A list may be set up which is comprised of a community of subscribers within a specified IMSI list. The list may also include wildcards and ranges MSISDN List
A community of subscribers may be set up for numbers within a specified MSISDN list. The list may also include wildcards and ranges.

Figure 14:
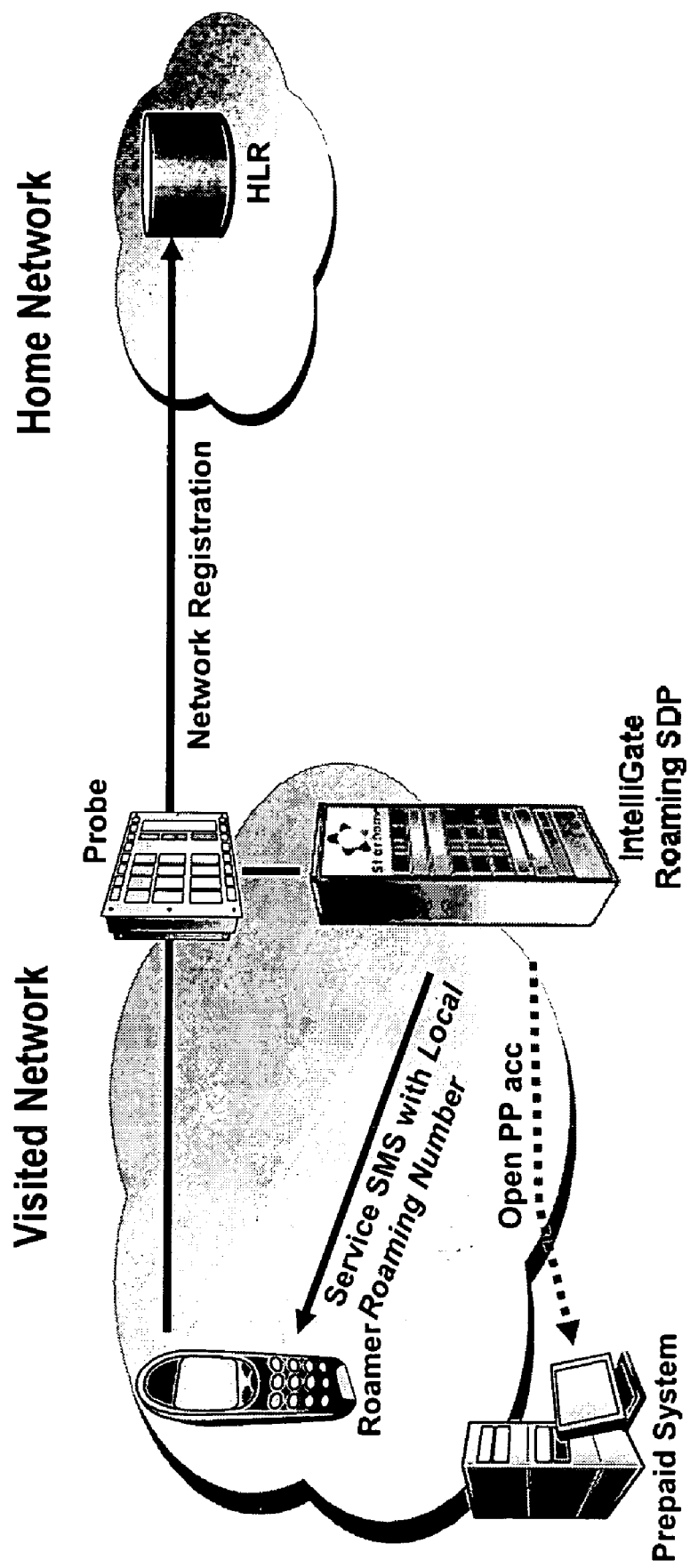
FIG. 14 is a schematic diagram illustrating registration of a roaming mobile handset via its home network and opening of a prepaid account.

Local Prepaid Account
In a number of embodiments described above, the possibility was mentioned of using a local prepaid account for the service. This is now discussed in greater detail. The local prepaid account is provided for charging inbound roamers directly at the visited network.
When a roamer registers onto the VPMN, as illustrated in FIG. 14, the LRN service instructs the prepaid system to create an account based on the allocated local roaming number (local MSISDN) and the roamer's IMSI. This action can optionally be complemented with adding an initial credit into the account to encourage usage and lower service adoption barriers.
Charging may be carried out using any of the following options. First of all there is an option to charge all mobile-originated and mobile terminated calls via the local prepaid system. This option is suited to inbound non-CAMEL prepaid roamers with barring enabled for MO calls.
A second option enables distinct charging per roamer's request or CLI replacement. That is to say, whenever the CLI for MO calls and SMS is changed to the Local Roaming Number, whether manually or automatically, charging for the calls is carried out via the local prepaid account.

As a further option, whenever the roamer calls local destinations, charging is via the local prepaid account regardless of the CLI replacement. For International destinations charging is via the home network.

Mobile Terminated Calls

The visited network operator may decide to provide the service by charging inbound roamers for mobile-terminated calls. In this case, all mobile-terminated calls to the local roaming number are charged via the local prepaid account. In many cases, Mobile-Terminated calls are provided free of charge when within the visited network.

Mobile Originated Calls

The flow for Mobile-Originated calls is affected by the CLI mode and the local prepaid account configuration for charging mobile originated traffic.

Figure 15:
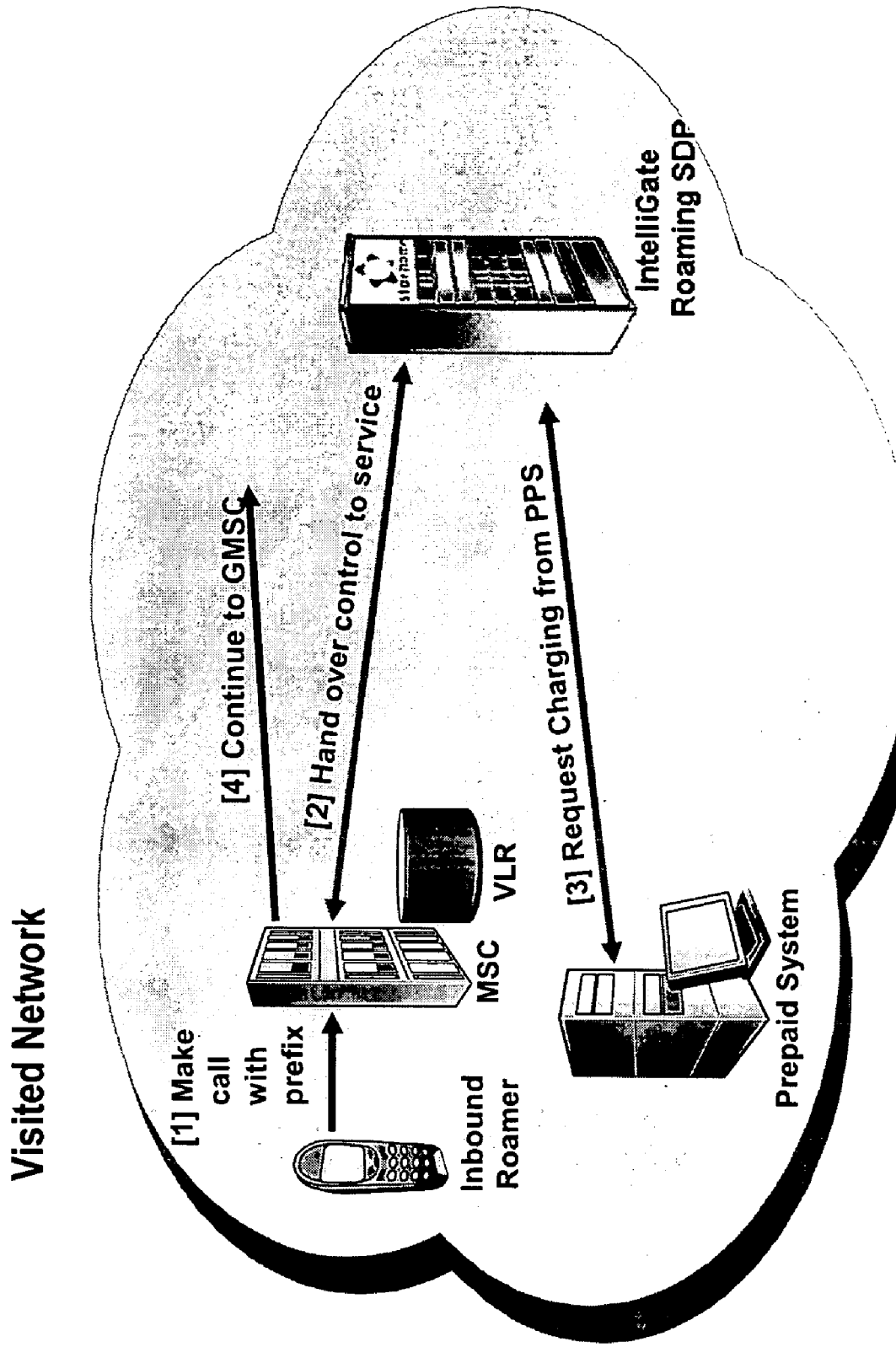
FIG. 15 is a simplified flow chart illustrating a further embodiment of mobile originated call flow.

FIG. 15 illustrates the flow described above for a mobile originated call using a prepaid system.

The service can also be configured and provided for MO calls with local prepaid charging if the balance is positive and charged with regular roaming charges when the local prepaid account is empty.

Mobile Terminated SMS

The recommended charging method is to allow receiving MT SMS free of charge in the network. Nevertheless, the LRN service can still trigger the local prepaid account for each MT SMS and charge the roamer.

Mobile Originated SMS—Using Map Relay

Figure 16:
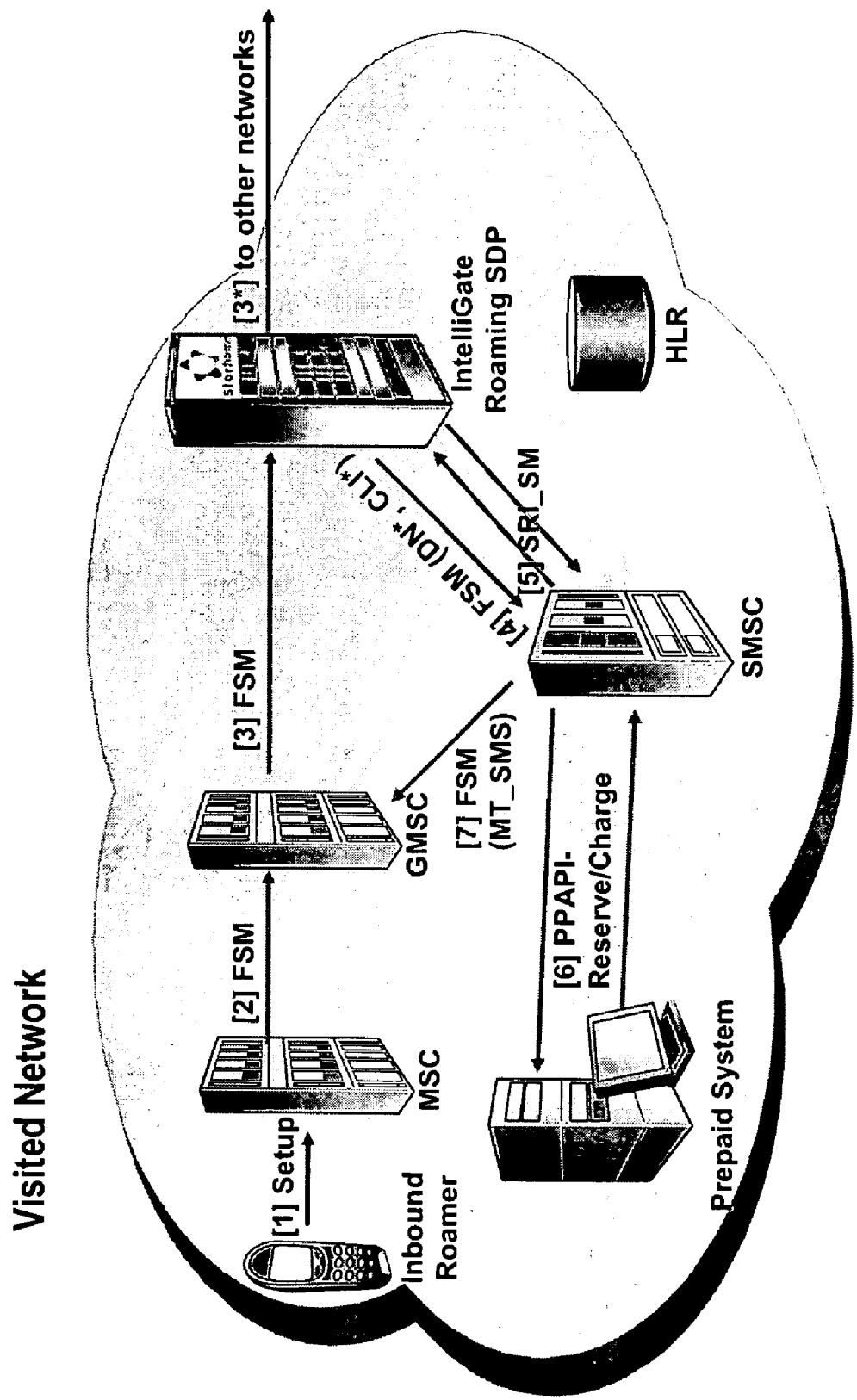
FIG. 16 is a flow chart illustrating an alternative embodiment according to the present invention of flow for mobile originated SMS.

Reference is now made to FIG. 16 which illustrates the flow for mobile originated SMS using MAP relay. The Intelligent Gateway functions as a Signaling Relay Module to intercept the MO SMS on its way to the home SMSC and as the HLR for the local roaming numbers. An inbound roamer originates an SMS towards the home SMSC with a prefixed dialed number, which may be to a local or international destination. The SMS is intercepted by the signaling relay module in the Intelligent Gateway, which removes the prefix and changes the CLI. The Intelligent Gateway forwards the SMS to the local SMSC for further handling, thereby sending the message to its destination with the new CLI. The Intelligent Gateway acts as the HLR for all MSISDNs allocated for Local Roaming Number service. The SMSC thus sends a MAP_SRI_SM signal to the Intelligent Gateway which may relay the query to the actual HLR to locate the called or B-Party. The SMSC charges the sending or A-Party for the sending of the SMS from the local account, and the SMSC sends the SMS to its destination via MAP_FSM to the GMSC. The process is summarized in table 9 below.

TABLE 9

SMS using the prepaid system. Refers to FIG. 14.

| Step | Action |
| --- | --- |
| Steps 1, 2 & 3 | An inbound roamer originates an SMS towards the home SMSC with a prefixed dialed number (to local or international a destination) |
| Step 3* | The SMS is intercepted by the signaling relay module in the Intelligent gateway, which removes the prefix and changes the CLI |
| Step 4 | Intelligent gateway forwards the SMS to the local SMSC for further handling - sending the message to its destination with the new CLI |
| Step 5 | Intelligent gateway acts as the HLR for all MSISDNs allocated for Local Roaming Number service. The SMSC sends MAP_SRI_SM to Intelligent gateway which may relay the query to the actual HLR to locate B-Party |

TABLE 9-continued

SMS using the prepaid system. Refers to FIG. 14.

| Step | Action |
| --- | --- |
| Step 6 | The SMSC charges A-Party for the SMS sending from the local account |
| Step 7 | The SMSC sends the SMS to its destination via MAP_FSM to the GMSC |

It is expected that during the life of this patent many relevant devices and systems will be developed and the scope of the terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. System for managing of mobile phones at a roaming network, each mobile handset having a home network and a first number associated with said home network, and being currently located at said roaming network, the system comprising:
an assignment unit for assigning a second number to a respective roaming handset, the assigning being for the duration of at least the current visit of the roamer in the roaming network, the assigning being triggered by a temporary roaming registration of said mobile handset to said cellular roaming network, said second number being associated with said roaming network, and
a handling unit for translating said second number into said first number for the locating of said respective roaming handset within said roaming network using said second number, to render said respective handset reachable by dialing said first number and reachable as a local user by dialing said second number.

2. The system of claim 1, wherein said handling unit is configured for receiving access requests to said respective handset using said second number.

3. The system of claim 2, wherein a gateway mobile switching center (Gateway MSC) of said roaming network is configured to recognize calls involving said second number and to forward said calls to said handling unit.

4. The system of claim 2, wherein said handling unit comprises a location register for receiving access requests to said respective handset using said second number and accessing said respective handset using said first number.

5. The system of claim 4, wherein said accessing comprises: issuing a query for the visited location register to which the roaming handset is currently connected, issuing a query to obtain a mobile roaming number MSRN from the current VLR, receiving the MSRN from the current VLR, and returning the MSRN to the gateway MSC.

6. The system of claim 4, wherein said handling unit is configured to receive update location data from said respective handset using said first number and to store a corresponding updated location in association with said second number.

7. The system of claim 1, wherein said handling unit is configured as a substitute home location register such that calls to said respective roaming handset using said second number are placeable to said respective roaming handset without reference to said home network.

8. The system of claim 7, wherein a quantity of numbers are designated for assignment by said assignment unit, and wherein said network is configured such that handset calls to any of said designated numbers are automatically forwarded to said handling unit.

9. The system of claim 7, further comprising a roaming activity analysis unit for analyzing levels of roaming activity on the network, such that a quantity of roaming activity is selectable in accordance with said levels.

10. The system of claim 9, wherein said quantity is selected to allow a number assigned to a given roaming user to be reserved for a predetermined amount of time after most recent use by said given roaming user.

11. The system of claim 9, further comprising a roaming number state register for assigning states to said designated numbers, thereby to ensure that numbers are assigned to new roamers only after a first predetermined time has passed since last use.

12. The system of claim 1, wherein said second number is further recognized by a roaming network payment system, thereby to allow a user to prepay using local prepaid cards of the roaming network.

13. The system of claim 1, wherein said handling unit is configured to identifying if the roamer is a prepaid subscriber for the home network by analyzing CAMEL triggers, thereby to restrict access to Mobile Originated calls.

14. The system of claim 13, wherein said identifying is further utilized to bar Supplementary services of said roaming network.

15. The system of claim 1, wherein said handling unit is configured to provide mobile terminated calls using said second number free of charge.

16. The system of claim 1, wherein said handling unit is further configured to handle text messaging using said second number.

17. The system of claim 16, wherein said handling unit is configured to support Mobile Originated SMS by: using at least one of the group comprising MAP Relay and IN triggers in order to capture the outgoing SMS; modify the CLI on the outgoing SMS to be the LRN, and also modify the destination to be within the LRN system, thereby to enforce charging; and forwarding the outgoing SMS for routing it to the final destination.

18. The system of claim 2, wherein a gateway mobile switching center (Gateway MSC) of said roaming network is configured to recognize Mobile Originated SMS involving said second number and to forward said messages to said handling unit.

19. The system of claim 18, wherein said handling unit comprises a location register for requesting access to said respective handset using said second number and accessing said respective handset using said first number.

20. The system of claim 19, wherein said accessing comprises: issuing a short message query for the visited location register to which the roaming handset is currently connected.

21. A method of operating mobile handsets at a roaming network, said roaming network being a cellular roaming network to which said mobile handset is temporary registered, and being other than a respective home network, respective mobile handsets having a first dialing number associated with the home network, the method comprising:
    assigning to a respective mobile handset a second, user dialing handset number associated with said roaming network for dialing to reach said respective roaming mobile handset,
    assigning a substitute home location register at said roaming network adapted to receive location queries based on said second number for routing corresponding calls to said respective handset, such that said second number assignment is triggered by a temporary roaming registration of said mobile handset to said cellular visited network and is for the duration of a current visit to said roaming network to reach said respective mobile handset, and
    querying a visited location register at said roaming network for routing of said calls using said first number, such that said first number is dialable to reach said respective mobile handset.

* * * * *